United States Patent
Fuse et al.

(10) Patent No.: US 10,027,848 B2
(45) Date of Patent: Jul. 17, 2018

(54) IMAGE PROCESSING APPARATUS AND CONTROL METHOD FOR APPLYING SPATIAL FILTERS TO IMAGES

(71) Applicant: CANON KABUSHIKI KAISHA, Tokyo (JP)

(72) Inventors: Koji Fuse, Tokyo (JP); Tomokazu Yanai, Yokohama (JP); Hisashi Ishikawa, Urayasu (JP); Akitoshi Yamada, Yokohama (JP); Minako Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/224,990

(22) Filed: Aug. 1, 2016

(65) Prior Publication Data
US 2017/0041502 A1    Feb. 9, 2017

(30) Foreign Application Priority Data

Aug. 6, 2015 (JP) ................... 2015-156244
Jul. 13, 2016 (JP) ................... 2016-138905

(51) Int. Cl.
| | |
|---|---|
| H04N 1/409 | (2006.01) |
| G06T 5/20 | (2006.01) |
| H04N 1/407 | (2006.01) |
| H04N 1/58 | (2006.01) |

(Continued)

(52) U.S. Cl.
CPC ............ *H04N 1/409* (2013.01); *G06T 5/20* (2013.01); *H04N 1/405* (2013.01); *H04N 1/4072* (2013.01); *H04N 1/58* (2013.01); *H04N 1/6008* (2013.01); *H04N 1/6027* (2013.01); *G06T 2207/10024* (2013.01); *G06T 2207/20024* (2013.01); *G06T 2207/30176* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2010/0309511 | A1 | 12/2010 | Ito |
| 2015/0170375 | A1 | 6/2015 | Ito |

FOREIGN PATENT DOCUMENTS

| | | |
|---|---|---|
| EP | 0942588 A2 | 9/1999 |
| EP | 2362632 A2 | 8/2011 |
| JP | H11-259646 A | 9/1999 |

OTHER PUBLICATIONS

European Search Report issued in corresponding application No. 16001703.4 dated Jan. 5, 2017.

*Primary Examiner* — Lennin Rodriguezgonzale
(74) *Attorney, Agent, or Firm* — Carter, DeLuca, Farrell & Schmidt LLP

(57) ABSTRACT

An image processing apparatus divides an input image into a plurality of band area images, stores the respective band area images in a band memory, and performs image processing. The apparatus comprises: a storage unit configured to store filter coefficients having a two-dimensional reference area of M pixels in a first direction and N pixels in a second direction orthogonal to the first direction; and a spatial filter unit configured to apply, to the band area image stored in the band memory, a spatial filter using the filter coefficients. The filter coefficients are set as the filter coefficients so as to refer to pixels for every K pixels in the second direction, and the spatial filter unit sequentially applies the spatial filter to the band area image K times in the second direction.

9 Claims, 17 Drawing Sheets

(51) Int. Cl.
*H04N 1/60* (2006.01)
*H04N 1/405* (2006.01)

FIG. 6

ARRANGEMENT OF REFERENCE PIXELS — 600a

| a | b | c | d | e |
|---|---|---|---|---|
|   |   |   |   |   |
| f | g | h | i | j |
|   |   |   |   |   |
| k | l | m | n | o |

PIXEL VALUE (IN PARENTHESES, COORDINATES ARE INDICATED) — 600b

| $p(i-2, j-2)$ | $p(i-1, j-2)$ | $p(i, j-2)$ | $p(i+1, j-2)$ | $p(i+2, j-2)$ |
|---|---|---|---|---|
|   |   |   |   |   |
| $p(i-2, j)$ | $p(i-1, j)$ | $p(i, j)$ | $p(i+1, j)$ | $p(i+2, j)$ |
|   |   |   |   |   |
| $p(i-2, j+2)$ | $p(i-1, j+2)$ | $p(i, j+2)$ | $p(i+1, j+2)$ | $p(i+2, j+2)$ |

FILTER COEFFICIENT — 600c

| 1 | 2 | 4 | 2 | 1 |
|---|---|---|---|---|
| 0 | 0 | 0 | 0 | 0 |
| 4 | 8 | -44 | 8 | 4 |
| 0 | 0 | 0 | 0 | 0 |
| 1 | 2 | 4 | 2 | 1 |

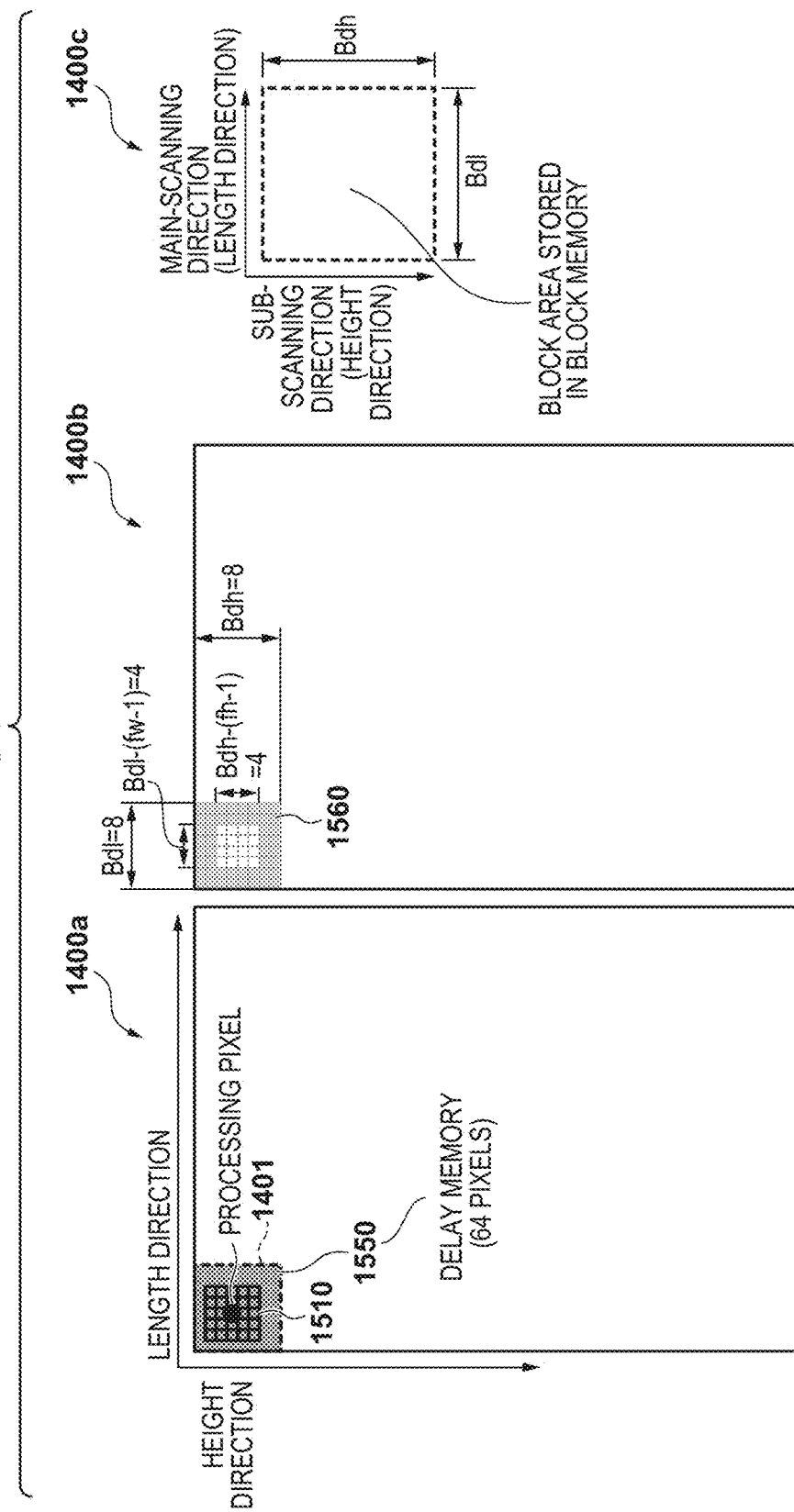

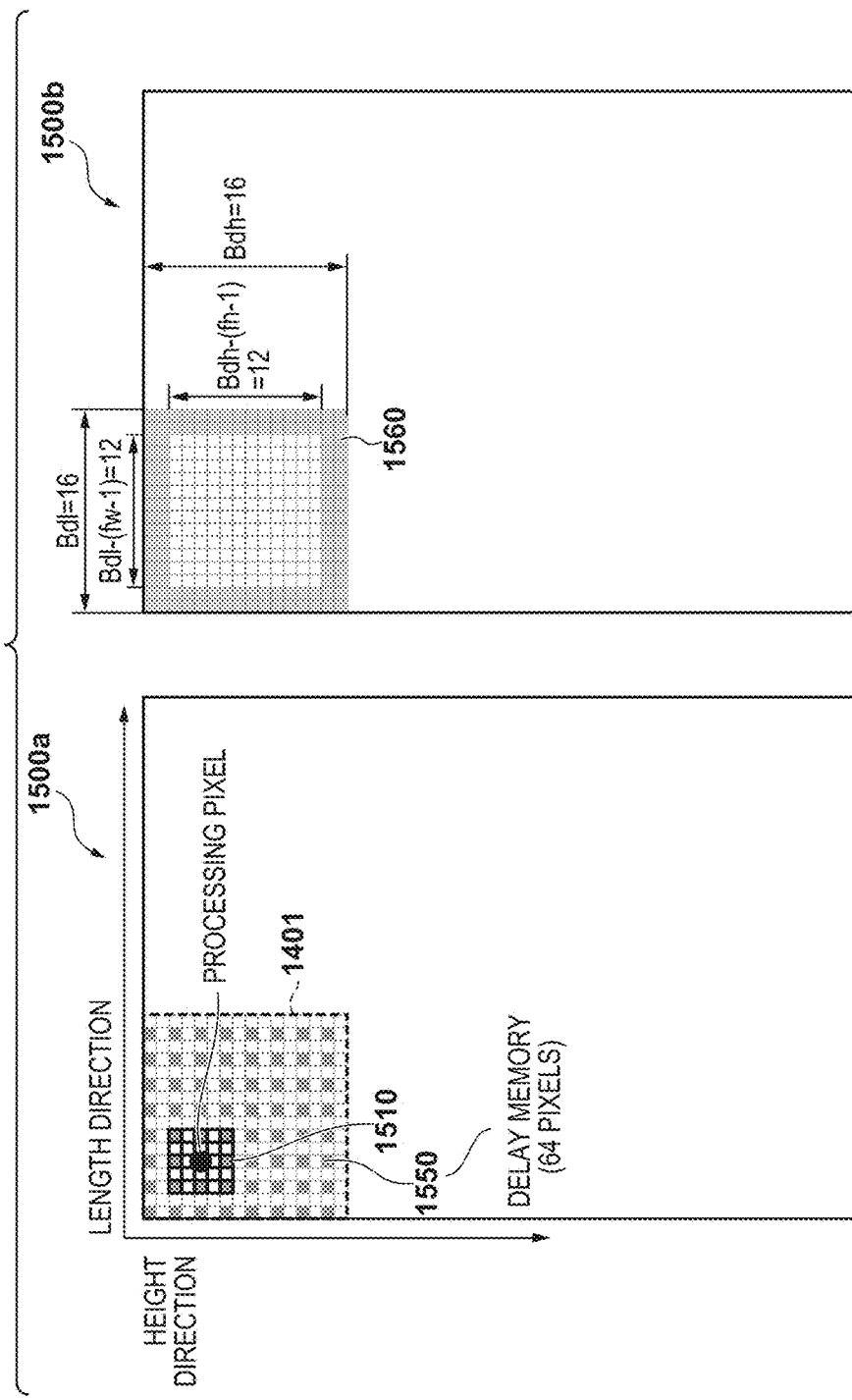

FIG. 16

| MODE | SIZE OF REFERENCE AREA | SAMPLING | NUMBER OF REFERENCE PIXELS | INCREASING RATE r OF TOTAL NUMBER OF TRANSFER PIXELS |
|---|---|---|---|---|
| IMAGE QUALITY PRIORITY MODE | 5-BY-5 PIXEL SQUARE | EVERY PIXEL IN VERTICAL AND HORIZONTAL DIRECTIONS (WITHOUT THINNING OUT) | 25 | 2 |
| MEDIUM-SPEED MODE | 5-BY-5 PIXEL SQUARE | ZIGZAG | 13 | 1.33 |
| HIGH-SPEED MODE | 5-BY-5 PIXEL SQUARE | EVERY TWO PIXELS IN VERTICAL AND HORIZONTAL DIRECTIONS | 9 | 1.14 |

FIG. 17

| RESOLUTION | SIZE OF REFERENCE AREA | SAMPLING | NUMBER OF REFERENCE PIXELS | INCREASING RATE r OF TOTAL NUMBER OF TRANSFER PIXELS |
|---|---|---|---|---|
| 600dpi | 5-BY-5 PIXEL SQUARE | EVERY TWO PIXELS IN VERTICAL DIRECTION EVERY PIXEL IN HORIZONTAL DIRECTION | 15 | 1.33 |
| 1200dpi | 9-BY-9 PIXEL SQUARE | EVERY FOUR PIXELS IN VERTICAL DIRECTION EVERY TWO PIXELS IN HORIZONTAL DIRECTION | 15 | 1.33 |

FIG. 18

| BLUR WIDTH | SIZE OF REFERENCE AREA | SAMPLING | NUMBER OF REFERENCE PIXELS | INCREASING RATE r OF TOTAL NUMBER OF TRANSFER PIXELS |
|---|---|---|---|---|
| SMALL | 5-BY-5 PIXEL SQUARE | EVERY TWO PIXELS IN VERTICAL DIRECTION EVERY PIXEL IN HORIZONTAL DIRECTION | 15 | 1.33 |
| LARGE | 9-BY-9 PIXEL SQUARE | EVERY FOUR PIXELS IN VERTICAL DIRECTION EVERY TWO PIXELS IN HORIZONTAL DIRECTION | 15 | 1.33 |

IMAGE PROCESSING APPARATUS AND CONTROL METHOD FOR APPLYING SPATIAL FILTERS TO IMAGES

BACKGROUND OF THE INVENTION

Field of the Invention

The present invention relates to an image processing technique using a spatial filter.

Description of the Related Art

When performing image forming and outputting an image, local image processing such as spatial filter processing is conventionally performed. This local image processing indicates image processing of performing some calculation using all pixels included in a reference area including a pixel (to be referred to as a processing pixel hereinafter) to be processed. For example, spatial filter processing such as edge emphasis processing or blur processing is performed for digital image data.

Such local image processing may use a method of processing a pixel array at the upper end of digital image data from the left end to the right end, processing the second pixel array from the upper end, and repeatedly executing the same processing up to a pixel array at the lower end. In this method, as the width of the digital image data in the main-scanning direction is larger, a larger memory capacity is required. For example, if an A4-size image is read by a scanner having a resolution of 600 dpi, and converted into digital image data, the digital image data has a size of about 5,000 pixels×7,000 pixels. If, therefore, one pixel has a data amount of 3 bytes (24 bits), a capacity of 5,000 pixels×7,000 pixels×3 bytes=105 MB is necessary to store the digital image data. To reduce a local memory (work area) used for image processing, a technique (to be referred to as band processing hereinafter) of performing image processing by dividing image data into a plurality of bands is generally used.

Furthermore, Japanese Patent Laid-Open No. 11-259646 (patent literature 1) discloses a technique (to be referred to as block processing hereinafter) of dividing digital image data into a plurality of block (tile) areas and separately performing local (vicinity) image processing in order to reduce a memory capacity necessary for image processing.

However, in the band processing or the block processing described in patent literature 1, since there are overlapping areas at the boundaries of the respective areas, if a reference area in the local image processing is widened, the total number of transfer pixels unwantedly increases. For example, if an image in which a blur in an optical system occurs is recovered by spatial filter processing, it is impossible to obtain sufficient recovery performance unless the reference area of the spatial filter is set to have the spread as large as a blur width, as shown in FIG. 19. If, therefore, the blur in the optical system is large, it is necessary to widen the reference area, resulting in an increase in the total number of transfer pixels. Alternatively, if noise in an imaging system is desirably removed by blurring an image by spatial filter processing, it is necessary to widen a blur range as the noise is larger. Therefore, if the noise in the imaging system is large, it is necessary to widen the reference area, resulting in an increase in the total number of transfer pixels.

SUMMARY OF THE INVENTION

According to one aspect of the present invention, an image processing apparatus for dividing an input image into a plurality of band area images so that each band area partially overlaps an adjacent band area, successively storing the respective band area images in a band memory, and performing image processing, the apparatus comprises: a storage unit configured to store filter coefficients having a two-dimensional reference area of M pixels in a first direction and N pixels in a second direction orthogonal to the first direction; and a spatial filter unit configured to apply, to the band area image stored in the band memory, a spatial filter using the filter coefficients, wherein the filter coefficients are set as the filter coefficients so as to refer to pixels for every K pixels in the second direction, and the spatial filter unit sequentially applies the spatial filter to the band area image K times so that sampling phases by the filter coefficients for the band area image are mutually different in the second direction.

According to another aspect of the present invention, an image processing apparatus for dividing an input image into a plurality of band area images so that each band area partially overlaps an adjacent band area, further dividing each band area image into a plurality of block area images so that each block area partially overlaps an adjacent block area, successively storing the respective block area images in a block memory, and performing image processing, the apparatus comprises: a storage unit configured to store filter coefficients having a two-dimensional reference area of M pixels in a first direction and N pixels in a second direction orthogonal to the first direction; and a spatial filter unit configured to apply, to the block area image stored in the block memory, a spatial filter using the filter coefficients, wherein the filter coefficients are set as the filter coefficients so as to refer to pixels for every K pixels in the second direction, and the spatial filter unit sequentially applies the spatial filter to the block area image K times so that sampling phases by the filter coefficients for the block area image are different in the second direction.

The present invention provides a technique of allowing more efficient execution of local image processing.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing an example of the reference area of a spatial filter;

FIG. 14 is a view for explaining the operation of filter processing in block processing;

FIG. 15 is a view for explaining spatial filter processing according to a fourth embodiment;

FIG. 16 is a table showing a plurality of processing modes according to a fifth embodiment;

FIG. 17 is a table showing switching of processing in accordance with a resolution according to a sixth embodiment;

FIG. 18 is a table showing switching of processing in accordance with a blur width according to a seventh embodiment.

DESCRIPTION OF THE EMBODIMENTS

Figure 1:
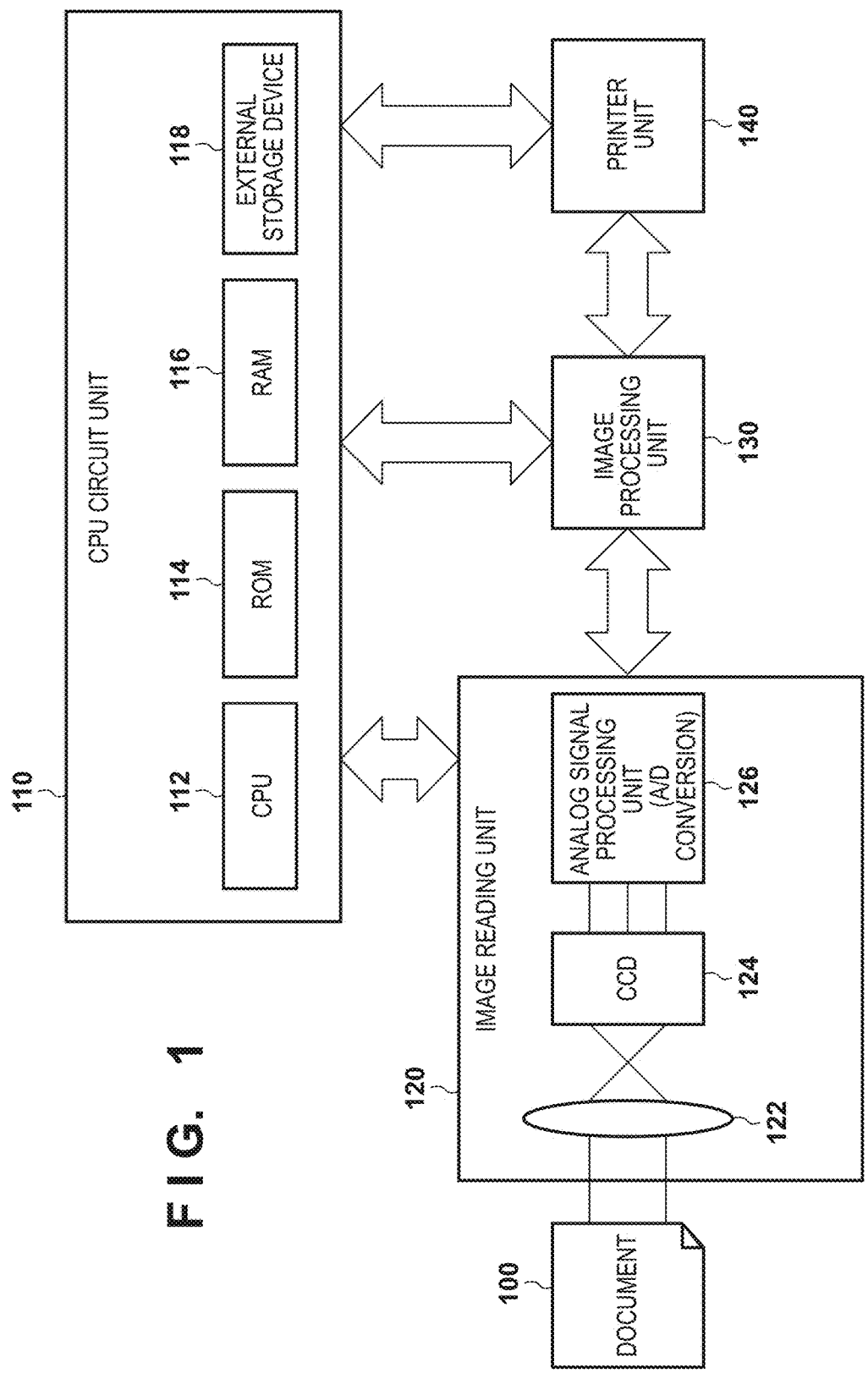
FIG. 1 is a block diagram showing the overall arrangement of an image processing apparatus according to a first embodiment.

Preferred embodiments of the present invention will be described in detail below with reference to the accompanying drawings. Note that the following embodiments are merely examples and are not intended to limit the scope of the present invention.

First Embodiment

As the first embodiment of an image processing apparatus according to the present invention, a multi-function peripheral (MFP) for reading a document, correcting (compensating for) an image blur caused by a reading optical system, and performing image forming will be exemplified below.

<Technical Premise>

The image processing method described in "BACKGROUND OF THE INVENTION" as the technical premise of the present invention will be explained first.

Block Processing

In this method, digital image data is divided into a plurality of block (tile) areas, and local (vicinity) image processing is separately performed. In this technique, to perform local (vicinity) image processing without any gap between the block areas, each block area is made to partially overlap an adjacent block area at the boundary. This can define a memory capacity by the size of each block (tile) area, thereby saving the memory capacity. Assume, for example, that A4-size digital image data (5,000 pixels in the main-scanning direction×7,000 pixels in the sub-scanning direction) having a resolution of 600 dpi is processed. This digital image data undergoes spatial filter processing having a reference area of 3 pixels×3 pixels. At this time, if each block (tile) area has a size of 16 pixels×16 pixels, the memory capacity is set to 0.75 Kbytes (16 pixels×16 pixels×3 bytes).

Note that the pixels of the above-described overlapping areas are transferred twice or four times. For example, if spatial filter processing is performed for the reference area of 3 pixels×3 pixels, the total number of transfer pixels is 1.31 times larger than the number of pixels of the original digital image data which is 5,000 pixels×7,000 pixels. If spatial filter processing is performed for a spatial filter area of 9 pixels×9 pixels, the overlapping areas further increase, and thus the total number of transfer pixels of the digital image data becomes four times larger than the number of pixels of the original digital image data.

Band Processing

In this method, local (vicinity) image processing is successively performed by scanning pixels in each of a plurality of band areas obtained by dividing one image data in the sub-scanning direction. In this technique, a memory capacity for performing image processing for the pixels in each band area can depend on the size of the band area (the height of the band area) in a direction perpendicular to the main-scanning direction of the band area. That is, to perform local (vicinity) image processing without any gap between the band areas, each band area is made to partially overlap an adjacent band area at the boundary. Unlike the above-described block processing, the overlapping areas do not form a mesh shape. Therefore, as compared with the block processing, the number of times the same pixel is retransferred becomes small, resulting in a small total number of transfer pixels.

<Overview>

In the first embodiment, in band processing, some of the reference pixels of the reference area in spatial filter processing are appropriately thinned out. This reduces the number of pixels used for the spatial filter processing, thereby making it possible to suppress an increase in the total number of transfer pixels.

<Apparatus Arrangement>

FIG. 1 is a block diagram showing the overall arrangement of an image processing apparatus according to the first embodiment.

An image reading unit 120 is configured to include a lens 122, a CCD sensor 124, and an analog signal processing unit 126. An image of a document 100 formed on the CCD sensor 124 via the lens 122 is converted into R (Red), G (Green), and B (Blue) analog electrical signals by the CCD sensor 124.

Image information obtained by conversion into the analog signals is input to the analog signal processing unit 126, undergoes correction and the like for each of R, G, and B, and then undergoes analog-to-digital conversion (A/D conversion). A digital full-color signal (to be referred to as a digital image signal hereinafter) is input to an image processing unit 130. The image processing unit 130 performs input correction processing, spatial filter processing, color space conversion, density correction processing, and halftone processing (all of which will be described later) for the digital image signal, and outputs the processed digital image signal to a printer unit 140.

The printer unit 140 is configured to include a print output unit (not shown) such as a raster plotter using an inkjet head, a thermal head, or the like, and prints an image on a sheet by the input digital image signal.

A CPU circuit unit 110 includes an arithmetic control CPU 112, a ROM 114 storing permanent data and programs, a RAM 116 used to temporarily save data and load the program, and an external storage device 118. The CPU circuit unit 110 controls the image reading unit 120, image processing unit 130, and printer unit 140, thereby comprehensively controlling the sequence of the image processing apparatus. The external storage device 118 is a medium such as a disk for storing parameters and programs to be used by the image processing apparatus, and the data and programs in the RAM 116 may be loaded from the external storage device 118.

Figure 2:
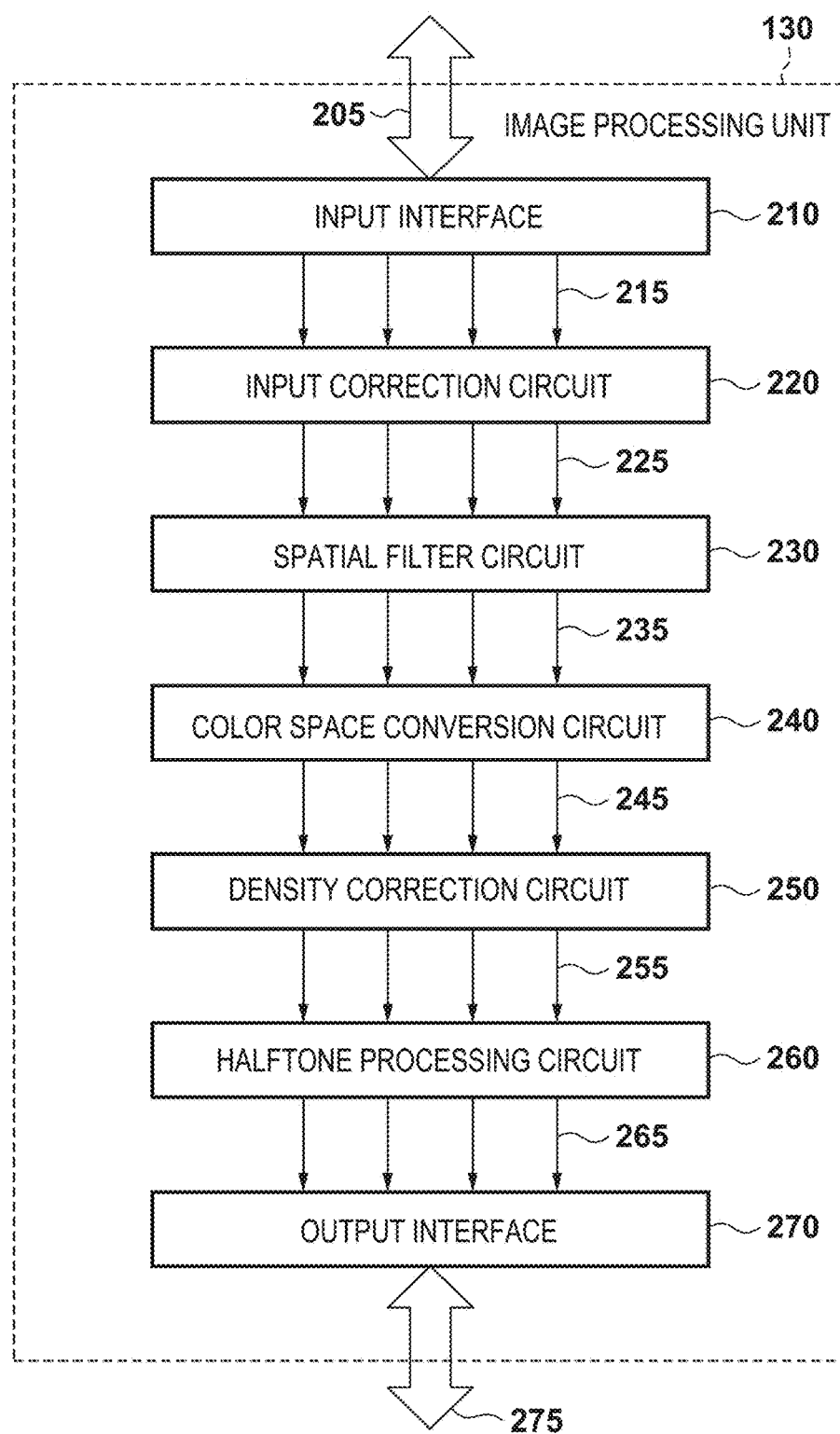
FIG. 2 is a block diagram showing the arrangement of an image processing unit.

FIG. 2 is a block diagram showing the arrangement of the image processing unit. The digital image signal output from the analog signal processing unit 126 is input to the image processing unit 130 via a bus 205. The image processing unit 130 includes an input interface 210, an input correction circuit 220, a spatial filter circuit 230, a color space conversion circuit 240, a density correction circuit 250, a halftone processing circuit 260, and an output interface 270. The input correction circuit 220, spatial filter circuit 230, color space conversion circuit 240, density correction circuit 250, and halftone processing circuit 260 will be described in detail below.

The input correction circuit 220 receives a digital image signal 215 via the input interface 210. The digital image signal 215 includes R, G, and B luminance signals. The input correction circuit 220 performs processing for correcting a variation in the characteristic of a sensor for reading the document 100 and the light distribution characteristic of a document illumination lamp.

The spatial filter circuit 230 receives a digital image signal (R, G, and B luminance signals) 225 output from the input correction circuit 220. The spatial filter circuit 230 is a circuit corresponding to the main characteristic portion of the first embodiment, and performs local (vicinity) image processing such as smoothing, edge emphasis, and optical blur correction for the digital image signal (R, G, and B luminance signals) 225.

The color space conversion circuit 240 receives a digital image signal (R, G, and B luminance signals) 235 output from the spatial filter circuit 230. The color space conversion circuit 240 converts the R, G, and B luminance signals of the digital image signal 235 into C (cyan), M (Magenta), Y (Yellow), and K (Black) density signals.

The density correction circuit 250 receives a digital image signal (C, M, Y, and K density signals) 245 output from the color space conversion circuit 240. The density correction circuit 250 performs density correction for the digital image signal (C, M, Y, and K density signals) 245. This is done because it is necessary to perform in advance density correction in consideration of the characteristics of halftone processing so as to prevent the density from changing when the signal is binarized in the halftone processing circuit 260 of the succeeding stage.

The halftone processing circuit 260 receives a digital image signal (C, M, Y, and K density signals) 255 output from the density correction circuit 250. The halftone processing circuit 260 performs screen processing for the digital image signal (C, M, Y and K density signals) 255, and converts the signal into a binary halftone expression. A binary digital image signal (C, M, Y, and K print signals) 265 is output to the printer unit 140 via the output interface 270 and a bus 275.

<Band Processing Operation in Spatial Filter Circuit 230>

In a low-end apparatus such as a home printer, the capacity of the main memory (corresponding to the RAM 116 of FIG. 1) of a system is small. Therefore, it is common practice to divide one image data into a plurality of band (strip-shaped) areas and expand each band area in the main memory, thereby performing various kinds of image processes.

This divided elongated area is called a band area, a storage area where data of the band area is expanded is called a band memory, and processing of dividing image data is called band division. The band memory is not always allocated as a storage area in the main memory, and may be allocated in any storage area on the system. For the sake of simplicity, an example in which the band memory is allocated in the main memory will be explained.

Figure 3:
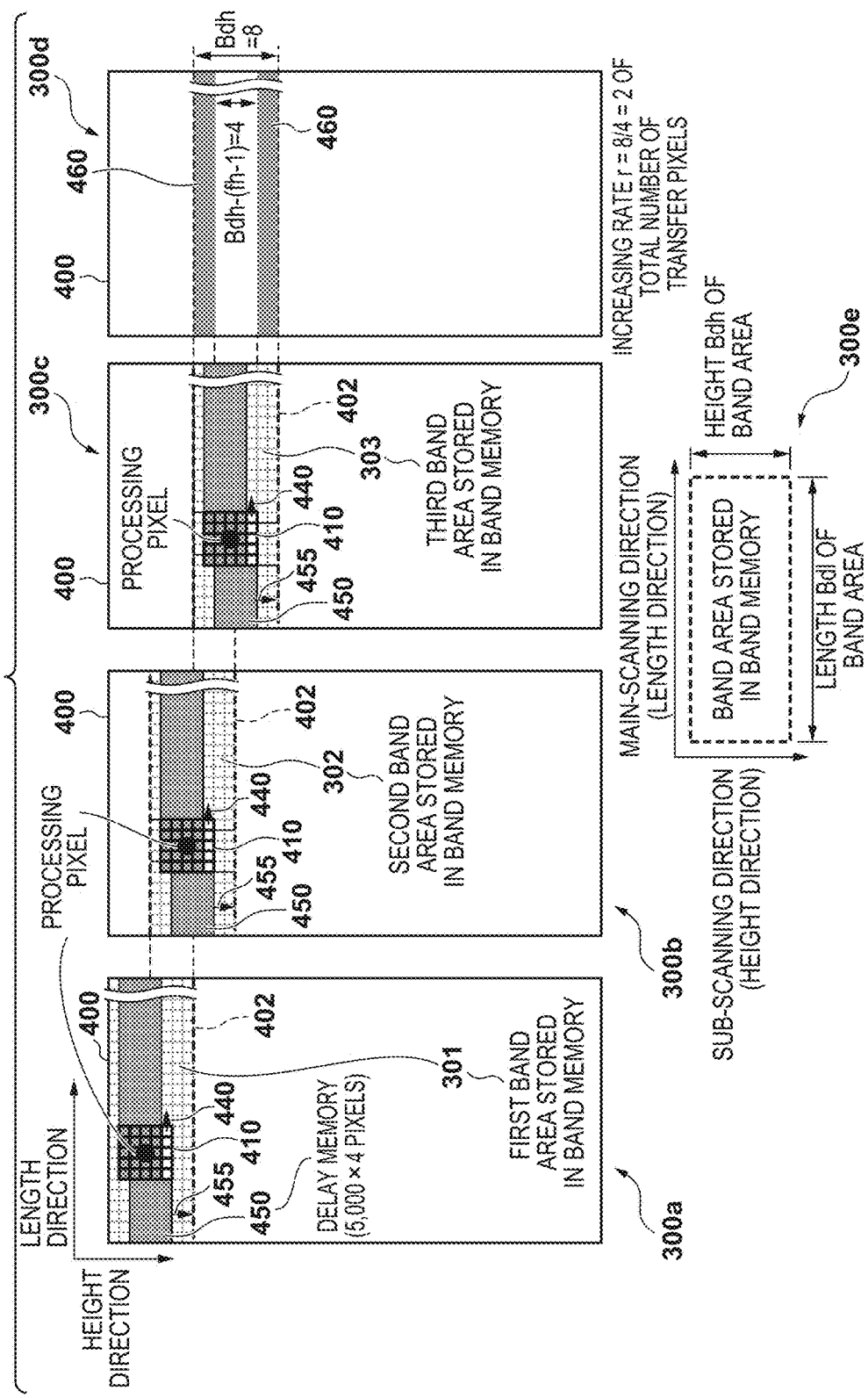
FIG. 3 is a view for explaining the operation of filter processing in band processing.

FIG. 3 is a view for explaining the operation of filter processing in the conventional band processing. In this example, the coordinate system (main-scanning direction-sub-scanning direction) of digital image data is defined by a new coordinate system (band area coordinate system) in length and height directions, and the band area is expressed by length×height, as shown in 300e. The length of the band area is either the width of the digital image data in the main-scanning direction or the height in the sub-scanning direction without exception. The height of the band area is an arbitrary value.

The band processing will be described in more detail. First, a first band area 301 as the first band area image is expanded in the band memory of the main memory, and undergoes image processing (300a). Then, a second band area 302 as the second band area image is expanded by overwriting in the band memory in which the band area 301 has been expanded, and undergoes image processing (300b). Furthermore, a third band area 303 is expanded by overwriting in the band memory in which the band area 302 has been expanded, and undergoes image processing (300c). Similarly, band areas up to the lower area of the image data are successively stored and undergo processing.

Note that the lengths (the main-scanning direction) of the band areas 301 to 303 are equal, but their heights (sub-scanning direction) need not be equal. The band memory serving as the storage area of the main memory is determined by the largest band area.

As described above, the band memory of the main memory is not limited to one storage area. For example, two band memories A and B may be allocated in the main memory. In this case, the band area 301 is expanded in the first band memory A, and undergoes the first image processing. Next, the first band area 301 is moved from the first band memory A to the second band memory B, and the second band area 302 is expanded in the first band memory A. It is preferable to perform the first image processing for the second band area 302 while performing the second image processing for the first band area 301. Such pipeline image processing becomes possible by dividing the digital image data into band areas and performing image processing.

A basic image processing method according to the first embodiment is the same as conventional band processing. The difference is that reference pixels in a spatial filter are reduced.

FIG. 6 is a view showing an example of the reference area of a spatial filter according to the first embodiment. Reference numeral 600a denotes a two-dimensional reference area (the arrangement of reference pixels) obtained by thinning out the reference pixels for every other row. A pixel h corresponds to the position of a processing pixel. Each of pixels a to o is a pixel corresponding to a filter coefficient other than 0, and is multiplied by the filter coefficient by the spatial filter. Note that in 600a, a blank box indicates a pixel whose pixel value is not referred to. In this spatial filter, the size (a width fw and a height fh) of the reference area defined by two direction (height and length directions) orthogonal to each other is a 5-by-5 pixel square which is equal to the size of the reference area in the conventional band processing (FIG. 3). However, the number of reference pixels used for the spatial filter processing in the reference area is 25 in the conventional band processing but is 15 in the first embodiment. Note that the filter coefficients are stored in a storage unit such as a filter coefficient register 560 (to be described later).

In this case, the resolution in the vertical direction (sub-scanning direction) is set to ½. High-frequency components in the vertical direction cannot be controlled but low-frequency components can be controlled. In this case, as shown in 600c, the coefficients of the spatial filter processing are equal to filter coefficients obtained by inserting "0" s for every other row. Conversely, if it is possible to perform processing using the spatial filter having the coefficients, the reference pixels can be thinned out. Note that "0" s are inserted for every other row (every two pixels) in this example but "0" s can be inserted for every K pixels where K represents an arbitrary positive integer of 1 or more.

In terms of the human visual characteristic, sensitivity to high-frequency image components is lower than that to low-frequency image components. Therefore, in the above-described processing of recovering a blur in the optical system, it is only necessary to recover the low-frequency image components to which sensitivity is high in terms of the visual characteristic. Consequently, it is possible to sufficiently correct a blur by the spatial filter processing using the filter coefficients obtained by inserting "0" s for every other row.

Figure 4:
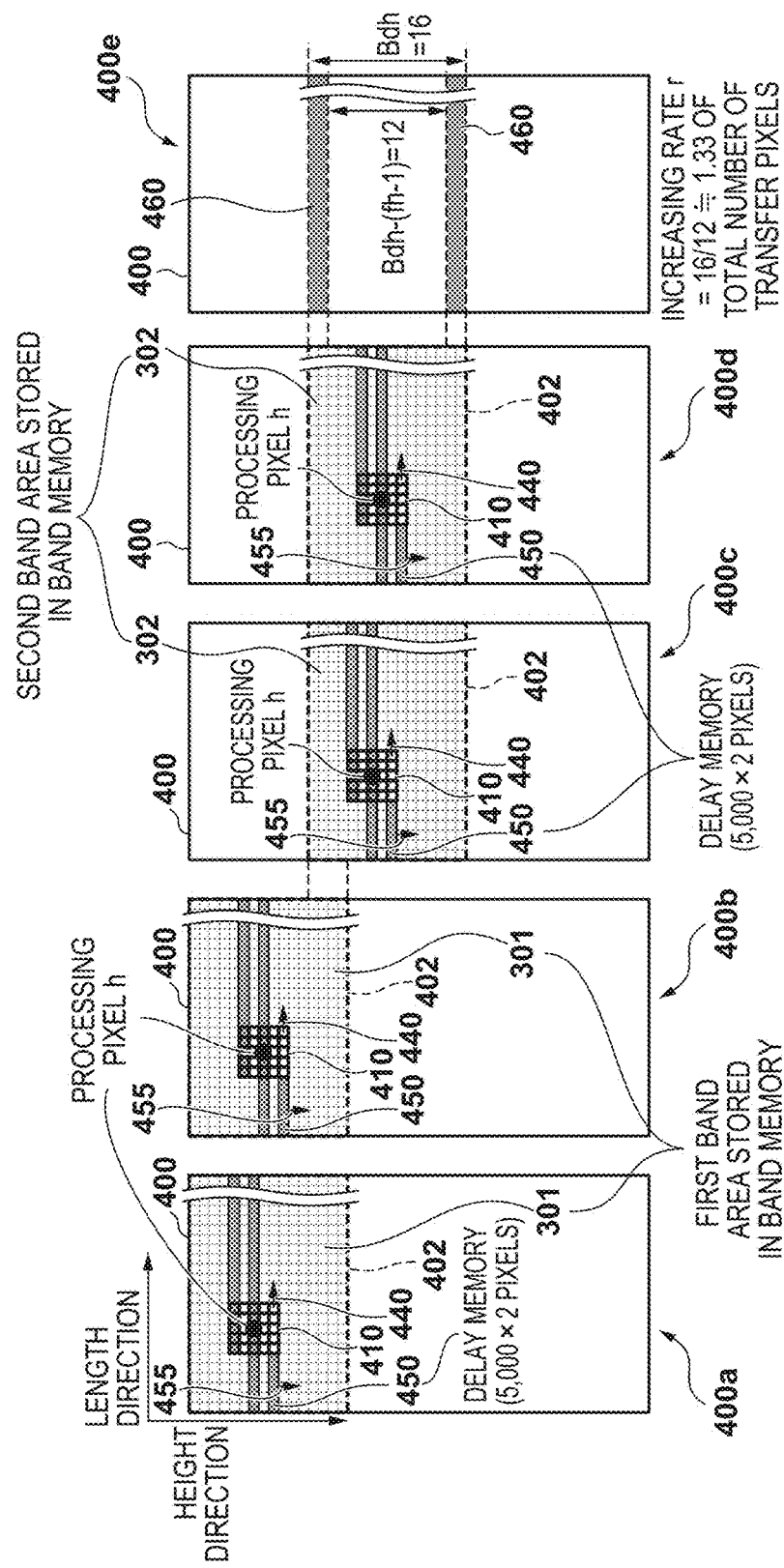
FIG. 4 is a view for explaining the operation of filter processing according to the first embodiment.

FIG. 4 is a view for explaining the operation of the filter processing according to the first embodiment. In this example, the filter coefficients shown in 600c are used. Note that data at pixel positions where the coefficients are 0 are not necessary for the filter processing and thus are not read out. The difference from the conventional band processing is that a pixel group (pixels of even-numbered rows) positioned on the even-numbered rows in the band area and a pixel group (pixels of odd-numbered rows) positioned on the odd-numbered rows are separately processed using the filter coefficients.

In 400a, reference numeral 400 denotes the entire area of the image data. The first band area 301 and the second band area 302 are respectively shown. As described above, since each band area is processed, image processing is performed in the coordinate system (length direction-height direction) different from the coordinate system (main-scanning direction-sub-scanning direction) of the image data 400. Referring to FIG. 4, the first band area is formed from 0th to 15th rows, and the processing pixel h is one of the pixels positioned on the sixth row. Note that the 15 reference pixels of the even-numbered rows in a reference area 410 shown in 400a correspond to the pixels a to o shown in 600a. In the first embodiment, to reduce the total number of transfer pixels, the pixels of the even-numbered rows and the pixels of the odd-numbered rows are separately processed in each band. By separately processing the pixels of the even-numbered rows and the pixels of the odd-numbered rows, it is possible to process a band having a height twice that in the conventional band processing (FIG. 3) with the same delay memory capacity, as shown in FIG. 4.

For the band area 301, image processing is executed for each pixel from the pixel at the upper left end of the even-numbered row of the band area in the length direction (main-scanning direction) of the band area. In the band area 301, image processing starts from the pixel at the left end of the 0th row in the image data 400. When the pixel at the right end of the even-numbered row of the band area is reached, a pixel to undergo image processing is advanced to the start position of the next even-numbered row. Then, image processing is executed again for each pixel from the pixel at the left end of the even-numbered row of the band area to the pixel at the right end of the even-numbered row in the length direction of the band area. The series of image processes is executed up to the pixel at the lower right end of the even-numbered row of the band area, thereby terminating the band processing for the pixels of the even-numbered rows.

After the end of the processing for the pixels of the even-numbered rows of the band area 301, the same local (vicinity) image processing is performed for the pixels of the odd-numbered rows of the band area 301, as shown in 400b. That is, for the band area 301, image processing is executed for each pixel from the pixel at the upper left end of the odd-numbered row of the band area in the length direction of the band area. In this example, image processing starts from the pixel at the left end of the 1st row. When the pixel at the right end of the odd-numbered row of the band area is reached, a pixel to undergo image processing is advanced to the start position of the next odd-numbered row. Then, image processing is executed again for each pixel from the pixel at the left end of the odd-numbered row of the band area to the pixel at the right end of the odd-numbered row in the length direction of the band area. The series of image processes is executed up to the pixel at the lower right end of the odd-numbered row of the band area, thereby terminating the band processing for the pixels of the odd-numbered rows.

As described above, one band processing ends by performing band processing for the pixels of the even-numbered rows and band processing for the pixels of the odd-numbered rows. That is, in this example, the spatial filter is sequentially applied twice at two sampling phases using the spatial filter thinned out for every other row (every two pixels). If the spatial filter is thinned out for every K pixels, the spatial filter is sequentially applied K times at K sampling phases.

After the end of the above-described processing, band processing is executed for the band area 301, as shown in 400c and 400d. That is, similarly to the processing performed for the first band area 301, the band processing for the pixels of the even-numbered rows and the band processing for the pixels of the odd-numbered rows are executed for the next second band area 302, thereby performing local (vicinity) image processing. The same processing is performed for the third band area 303 and subsequent band areas (not shown).

Figure 7:
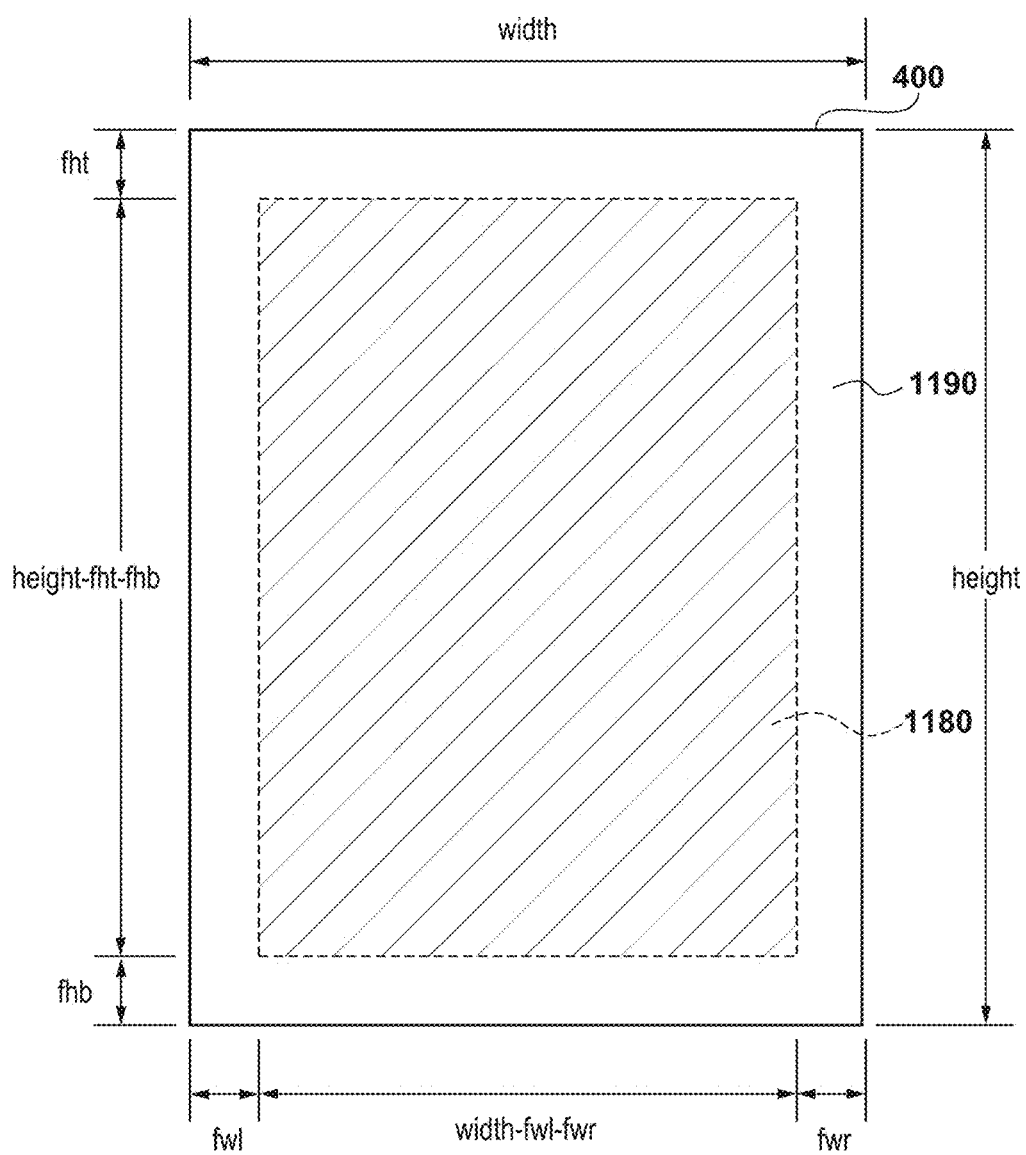
FIG. 7 is a view exemplarily showing an area for which spatial filter processing is executed.

FIG. 7 is a view exemplarily showing the area for which the spatial filter processing is executed. Similarly to the conventional technique, an area 1190 for which no spatial filter processing can be performed exists in the peripheral portion of the digital image data 400. This is because not all the pixel values in the reference area 410 can be substituted into the spatial filter processing. In principle, appropriate spatial filter processing cannot be performed for the area 1190. Therefore, to perform local (vicinity) image processing without any gap between the respective band areas (band areas 301, 302, and 303), overlapping pixel areas 460 shown in 400e are essential in each band area.

<Details of Filter Processing in Spatial Filter Circuit 230>

Figure 5:
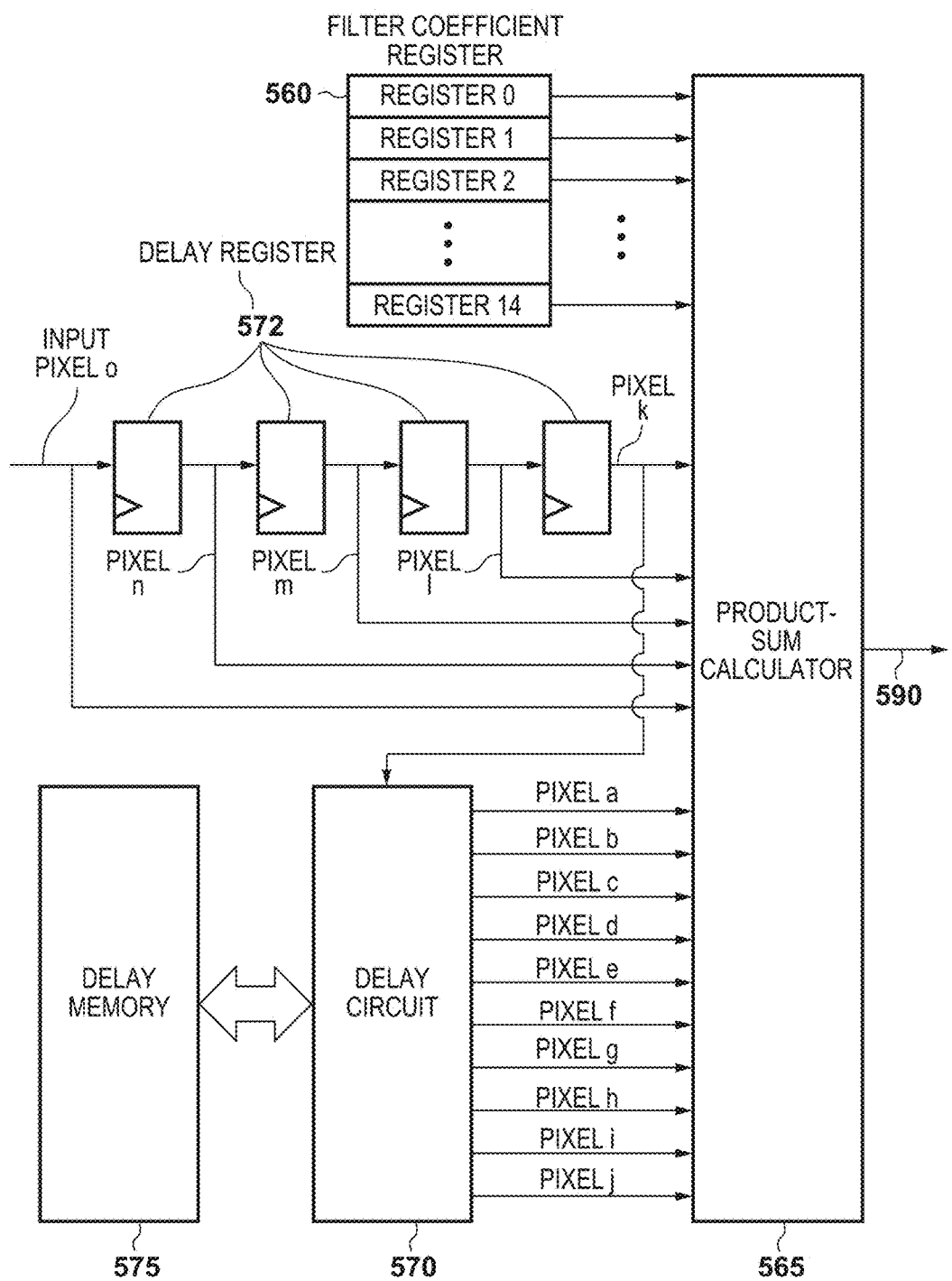
FIG. 5 is a view showing an example of the arrangement of a spatial filter circuit.

FIG. 5 is a view showing an example of the arrangement of the spatial filter circuit. Details of the filter processing (product-sum calculation processing) in the spatial filter circuit 230 will be described below.

In the spatial filter circuit 230, a product-sum calculator 565 receives the pixel values of input pixels shown in 600b. The product-sum calculator 565 receives 15 weighted values (the filter coefficients other than 0 shown in 600c) from a filter coefficient register 560. In the spatial filter circuit 230, a state in which all of the 15 pixels a to o in the reference area 410 have been input corresponds to 400a.

The pixel values of the pixels k to o delayed by delay registers 572 are respectively input to the product-sum calculator 565. The pixel values of the pixels a to e and f to j are stored in a delay memory 575, extracted from the delay memory 575 by a delay circuit 570, and input to the product-sum calculator 565.

The product-sum calculator 565 performs predetermined calculation using the pixel values of the pixels a to o and the 15 weighted values from the filter coefficient register 560, and outputs a filter calculation result 590 of the processing pixel. The output value is the image processing result of the processing pixel h shown in 400a.

After that, the spatial filter circuit 230 stores the pixel value of the pixel b while erasing the pixel value of the pixel a by overwriting the pixel value of the pixel a in the delay memory 575 with the pixel value of the pixel b via the delay circuit 570. With the same operation as that of the ring type FIFO (First-In First-Out) of the delay circuit 570, a pixel area 450 shown in 400a and stored in the delay memory 575 always has four lines. That is, the number of lines is one smaller than the height "5" of the reference area 410 (in this example, the reference area is thinned out in the height direction to ½, and thus the actual number of lines is two which is ½ the number of lines). As the processing pixel advances, the pixel area 450 stored in the delay memory 575 transits in a direction (the height direction of the band area) perpendicular to a scanning direction 440 (the length direction of the band area) of the input pixels. Note that in 400a, the direction in which the pixel area 450 stored in the delay memory 575 transits is shown as a scanning direction 455 of the delay memory.

The processing in the spatial filter circuit 230 for the pixels of the even-numbered rows has been explained. Processing in the spatial filter circuit 230 for the pixels of the odd-numbered rows is also the same.

<Effects>

Delay Memory Capacity

The capacity of the delay memory 575 according to the first embodiment depends on a length Bdl of the band area and the height fh of the reference area 410, given by:

delay memory capacity $Dbuf=Bdl \times (fh-1)/2$  (1)

On the other hand, in the conventional band processing (FIG. 3), the delay memory capacity Dbuf is given by:

delay memory capacity $Dbuf=Bdl \times (fh-1)$  (2)

That is, in the first embodiment, the even-numbered rows and the odd-numbered rows are separately processed in each band. Therefore, it is apparent that if Bdl and fh are equal to those in the conventional band processing, half the delay memory capacity Dbuf in the conventional band processing is required.

Increasing Rate of Total Number of Transfer Pixels

In the first embodiment, it is apparent from equations (1) and (2) that if Dbuf and fh are equal to those in the conventional band processing, it is possible to ensure the height of the band area, which is twice a height Bdh of the band area in the conventional band processing. That is, as shown in FIGS. 4 and 3, the delay memory capacities Dbuf are equal but the height of the band area which is twice that in the conventional band processing can be ensured in the first embodiment.

As described in "BACKGROUND OF THE INVENTION", in the local image processing, the total number of transfer pixels unwantedly increases to exceed the total number of pixels of the digital image data. When the reference area 410 has the height fh, an increasing rate r is given by:

increasing rate $r$ of total number of transfer pixels= $(Bdh)/(Bdh-(fh-1))$  (3)

It is apparent from equation (3) that if fh is constant, the increasing rate r decreases to approach "1" as the height Bdh of the band area increases. In the first embodiment, since it is possible to ensure the height of the band area, which is twice that in the conventional band processing, the total number of transfer pixels is reduced, as compared with the conventional band processing.

Control Performance of Frequency Characteristic

In the first embodiment, since the reference pixels are thinned out and decreased for every other row, the control performance of the high-frequency components in the vertical direction deteriorates, as compared with the conventional band processing. On the other hand, since the size (width fw and height fh) of the reference area remains unchanged, the control performance of the low-frequency components is the same as that in the conventional band processing. As described above, in terms of the human visual characteristic, sensitivity to the high-frequency components is lower than that to the low-frequency components. Thus, it is apparent that sufficient blur correction is possible in the recovery of a blur in the optical system.

As described above, according to the first embodiment, in the band processing, the spatial filter obtained by thinning out the reference pixels in the reference area without changing the size (width fw and height fh) of the reference area is used. More specifically, the spatial filter (FIG. 6) obtained by thinning out the reference pixels for every other row is used to perform processing. This arrangement makes it possible to reduce the delay memory capacity and decrease the total number of transfer pixels, as compared with conventional band processing.

Note that processing is performed by dividing image data into horizontally elongated bands in this embodiment. The present invention, however, is applicable to an arrangement in which processing is performed by dividing image data into vertically elongated bands. In this case, band processing is possible by rotating the scanning direction by 90°.

Second Embodiment

The second embodiment will describe another method of thinning out the reference pixels of a spatial filter. That is, although the reference pixels are thinned out for every other row in the first embodiment, the thinning out method is not limited to this.

Note that in Examples 1 to 4 to be described below, the size of a reference area is set to a 5-by-5 pixel square (a width fw=5 and a height fh=5), similarly to the conventional band processing (FIG. 3). An equal delay memory capacity is set.

Example 1 (Column Thinning Out)

Figure 8:
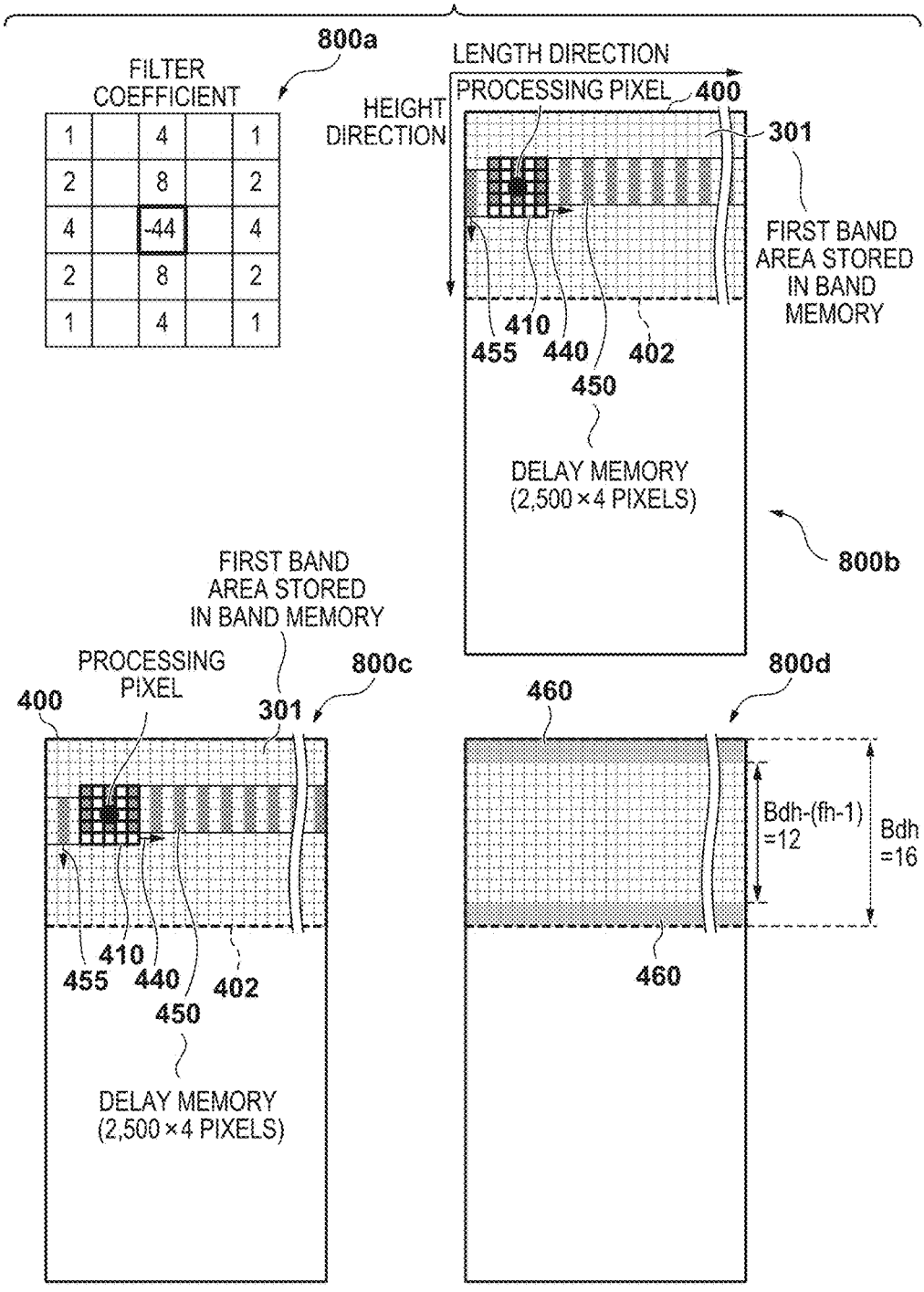
FIG. 8 is a view for explaining spatial filter processing according to a second embodiment (Example 1)

FIG. 8 is a view for explaining spatial filter processing according to the second embodiment. In this example, as shown in 800a, a reference area of a 5-by-5 pixel square is thinned out for every other column. In this case, processing for one band area is divided into two processes, that is, processing for pixels of even-numbered columns and processing for pixels of odd-numbered columns, as shown in 800b and 800c. Note that 800b and 800c each show processing for a band area 301 as an example. However, the same processing method is used for the remaining band areas.

In the example of FIG. 8, as a result of dividing the processing into the two processes, the band area has a height Bdh of 16 pixels, which is twice that in the conventional processing. Therefore, as shown in 800d, an increasing rate r of the total number of transfer pixels is about 1.33. As compared with the conventional band processing shown in 300d, the increasing rate r of the total number of transfer pixels can be considered to be small.

Note that in the column thinning out shown in FIG. 8, the reference pixels are thinned out and decreased for every other column, and thus the control performance of high-frequency components in the horizontal direction deteriorates, as compared with the conventional band processing. However, for the same reason as that described in the first embodiment, it is possible to perform sufficient blur correction in recovery of a blur in an optical system.

Example 2 (Vertical and Horizontal Thinning Out)

Figure 9:
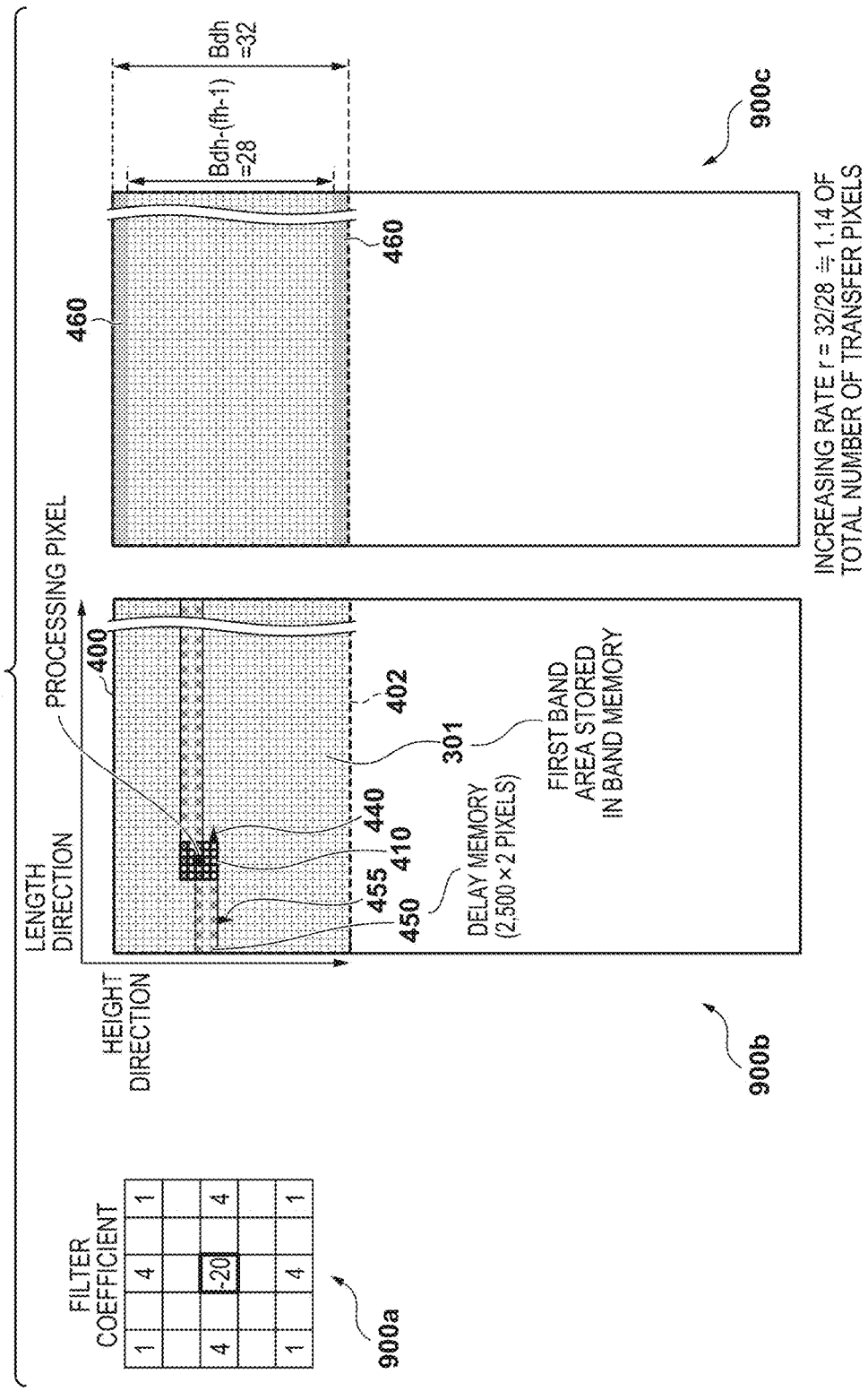
FIG. 9 is a view for explaining another spatial filter processing according to the second embodiment (Example 2)

FIG. 9 is a view for explaining another spatial filter processing according to the second embodiment. In this example, as shown in 900a, reference pixels are thinned out for every two pixels (every other pixel) in the length and height directions. In this case, processing for one band area is divided into four processes. That is, in this example, a spatial filter obtained by thinning out the reference pixels for every two pixels in the vertical and horizontal directions is used to sequentially apply the spatial filter four times at four sampling phases. If the reference pixels are thinned out for every K pixels in the height direction and for every L pixels in the length direction, the spatial filter is sequentially applied K×L times at K×L sampling phases.

One of the four processes of the processing for a band area 301 is exemplarily shown in 900b. More specifically, in 900b, processing is performed using a pixel group in which the remainder obtained by dividing a column number by 2 is "0" and the remainder obtained by dividing a row number by 2 is "0".

Although not shown, the second processing is performed using a pixel group in which the remainder obtained by dividing a column number by 2 is "1" and the remainder obtained by dividing a row number by 2 is "0". The third processing is performed using a pixel group in which the remainder obtained by dividing a column number by 2 is "0" and the remainder obtained by dividing a row number by 2 is "1". The fourth processing is performed using a pixel group in which the remainder obtained by dividing a column number by 2 is "1" and the remainder obtained by dividing a row number by 2 is "1".

In the example of FIG. 9, as a result of dividing the processing into the four processes, the band area has a height Bdh of 32 pixels which is four times that in the conventional processing. Therefore, as shown in 900c, an increasing rate r of the total number of transfer pixels is about 1.14. As compared with the conventional band processing shown in 300d, the increasing rate r of the total number of transfer pixels can be considered to be small.

Note that in the vertical and horizontal thinning out shown in FIG. 9, resolutions in the horizontal and vertical directions decrease to ½, and thus the control performances of high-frequency components in the horizontal and vertical directions deteriorate, as compared with the conventional band processing. However, for the same reason as that described in the first embodiment, it is apparent that sufficient blur correction is possible in recovery of a blur in an optical system.

Note that as is apparent from Example 2, in the present invention, one band area is divided into a plurality of pixel groups of different phases, and the same processing is performed for each pixel group. Each pixel group is obtained by sampling the pixels of one band area in a grid pattern having equal intervals. That is, when a and b represent integers and two-dimensional vectors v1 and v2 are unit grip vectors, sampling is performed at a grip point of v=a×v1+b×v2. The sampling position of an arbitrary pixel group can overlap that of another arbitrary pixel group by translating the pixel group.

The sampling positions of the divided pixel groups do not overlap each other, and an image obtained by combining all the divided pixel groups and an image in the one band area are set to completely match. The method of dividing one band area into pixel groups is based on the thinning out method. More specifically, one band area is divided into pixel groups so that thinned-out filter coefficients correspond to arbitrary positions in each pixel group.

For example, as shown in an example (to be described later), if filter coefficients have values for every two pixels in the length direction and for every four pixels in the height direction, the divided pixel groups are set to have values for every two pixels in the length direction and for every four pixels in the height direction.

That is, the pixels of one band area are sampled at the same sampling interval as that when thinning out the filter coefficients. Each of a plurality of pixel groups of different phases is obtained by changing the sampling phase and performing sampling at the same interval as that for the remaining pixel groups.

This can enlarge the height Bdh of the band area to a height larger than that in the conventional band processing when delay memory capacities Dbuf are equal. More specifically, if the band area is divided into n pixel groups, when the delay memory capacities Dbuf are equal, the height Bdh of the band area can be enlarged to a height n times larger than that in the conventional band processing.

Example 3 (Zigzag Thinning Out)

Figure 10:
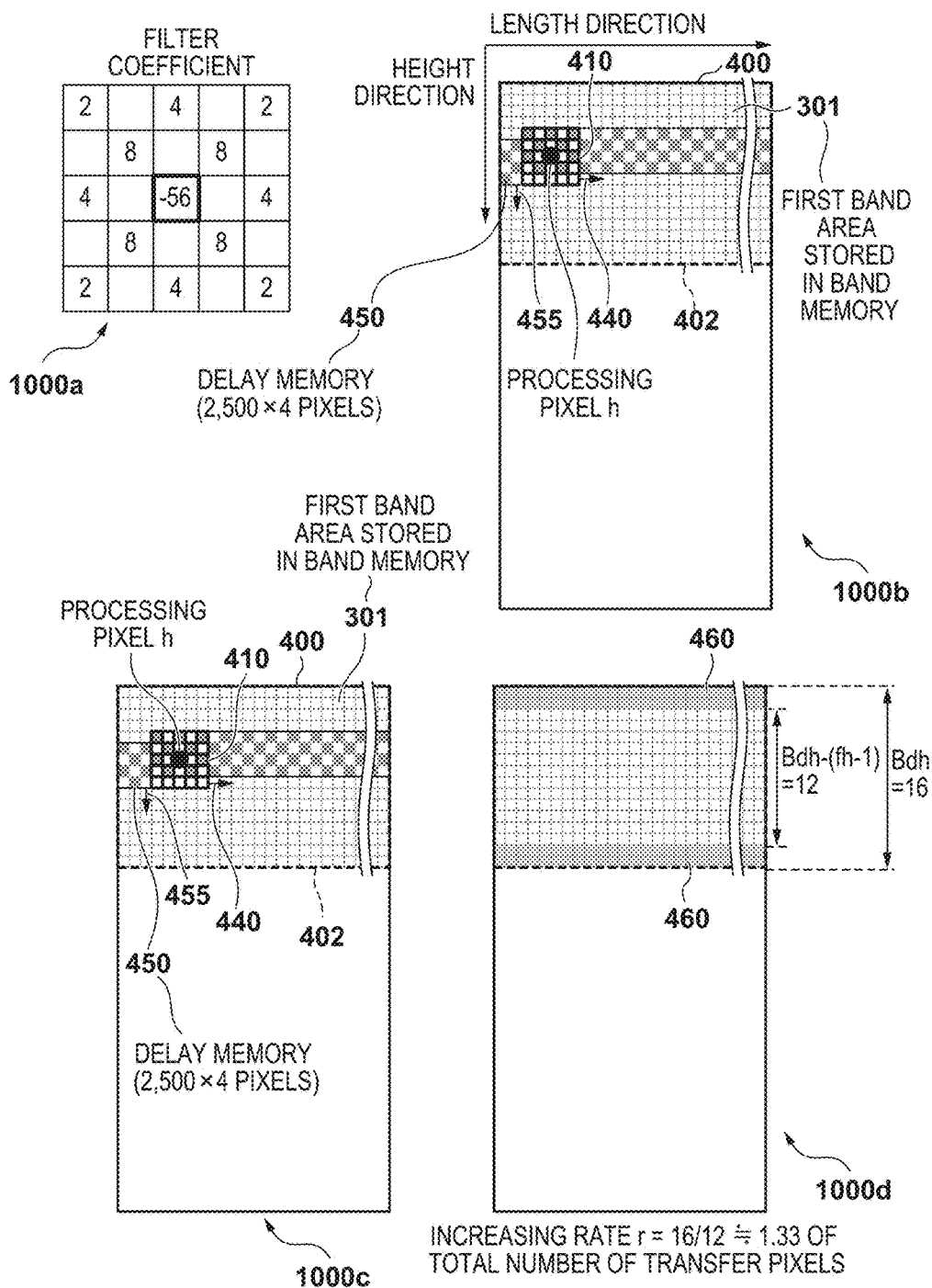
FIG. 10 is a view for explaining still another spatial filter processing according to the second embodiment (Example 3)

FIG. 10 is a view for explaining still another spatial filter processing according to the second embodiment. In this example, as shown in 1000a, reference pixels are thinned out in a zigzag pattern (checkerboard pattern). In this case, processing for one band area is divided into two processes, as shown in 1000b and 1000c.

In the example of FIG. 10, as a result of dividing the processing into the two processes, the band area has a height Bdh of 16 pixels which is twice that in the conventional processing. Therefore, as shown in 1000d, an increasing rate r of the total number of transfer pixels is about 1.33. As compared with the conventional band processing shown in 300d, the increasing rate r of the total number of transfer pixels can be considered to be small.

Note that in the zigzag thinning out shown in FIG. 10, the control performance of high-frequency components in a direction of 45° with respect to the horizontal direction deteriorates, as compared with the conventional band processing. However, deteriorations in the control performances of high-frequency components in the horizontal and vertical directions are reduced, as compared with row thinning out and column thinning out. Furthermore, for the same reason as that described in the first embodiment, it is apparent that sufficient blur correction is possible in recovery of a blur in an optical system.

Example 4 (Others)

Figure 11:
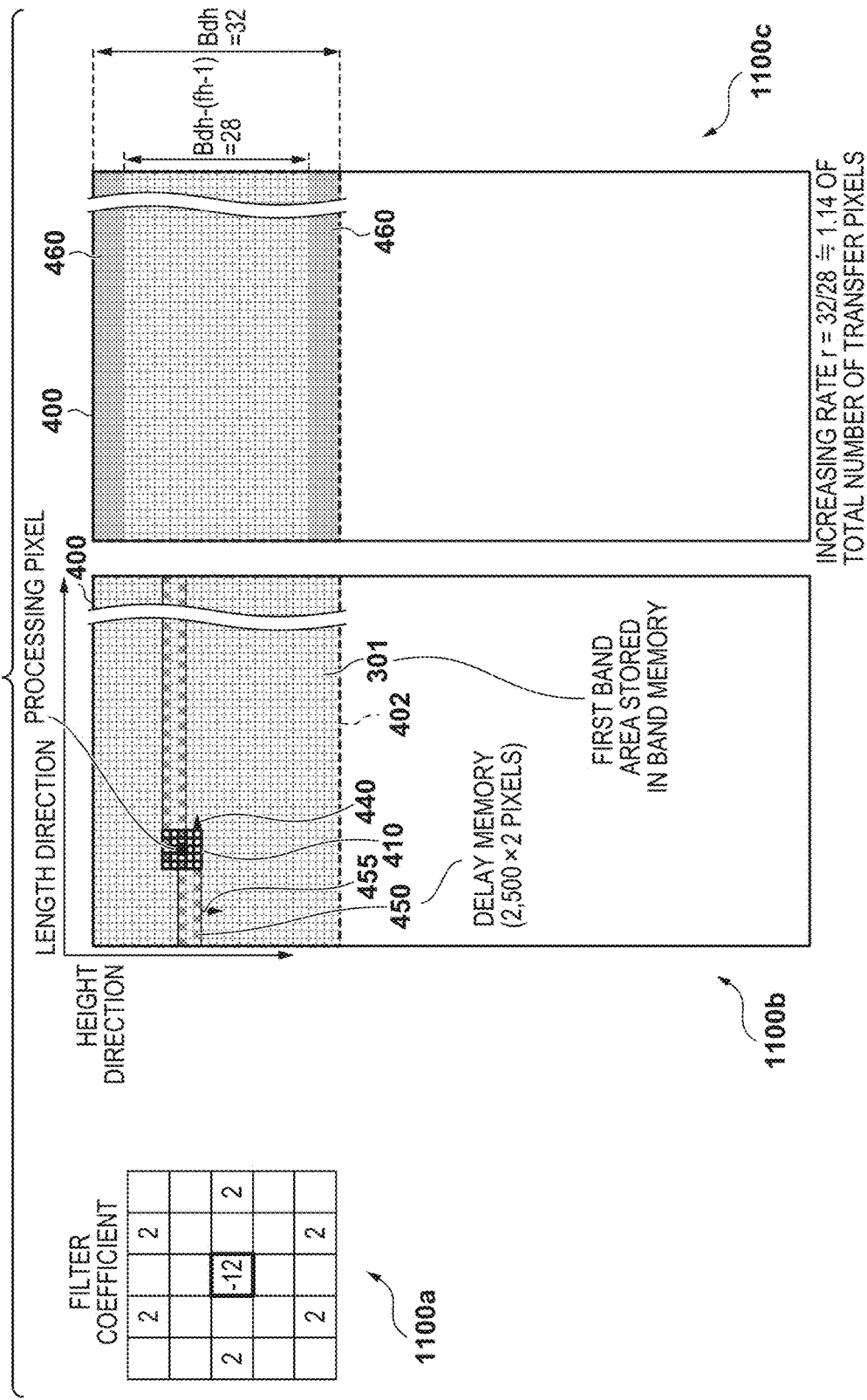
FIG. 11 is a view for explaining still another spatial filter processing according to the second embodiment (Example 4)

FIG. 11 is a view for explaining still another spatial filter processing according to the second embodiment. In this example, reference pixels are thinned out as shown in 1100*a*. In this case, processing for one band area is divided into four processes.

One of the four processes of the processing for a band area 301 is exemplarily shown in 1100*b*. The processing for one band area is completed by performing the same processing as that shown in 1100*b* for the remaining three pixel groups of different phases.

In the example of FIG. 11, as a result of dividing the processing into the four processes, the band area has a height Bdh of 32 pixels which is four times that in the conventional processing. Therefore, as shown in 1100*c*, an increasing rate r of the total number of transfer pixels is about 1.14. As compared with the conventional band processing shown in 300*d*, the increasing rate r of the total number of transfer pixels can be considered to be small. Note that in the thinning out method shown in FIG. 11, the reference pixels are isotropically arranged, as compared with Example 2, and thus a deterioration in the control performance of high-frequency components becomes isotropic, as compared with Example 2.

Third Embodiment

The third embodiment will describe an example in which the size of the reference area of a spatial filter is widened. That is, each of the first and second embodiments has explained a case in which the reference pixels in the reference area are thinned out without changing the size (width fw and height fh) of the reference area. However, the size of the reference area may be changed. That is, if the delay memory is constant, even if the size of the reference area is widened, it is possible to enlarge the height Bdh of the band area by thinning out the reference pixels, thereby suppressing an increase in the number of transfer pixels.

Note that in Examples 5 and 6 to be described below, a delay memory capacity is equal to that in the first embodiment (FIG. 4), and the size of a reference area is enlarged to K times (increasing rate K) in the height direction and L times (increasing rate L) in the length direction with respect to a size of M pixels×N pixels before the enlargement. That is, the number of pixels in the height direction of the enlarged reference area is K×(N−1)+1, and the number of pixels in the length direction of the enlarged reference area is L×(M−1)+1. At this time, coefficients (reference area enlargement filter coefficients) are set to refer to one pixel for every L×K pixels, and the spatial filter is sequentially applied L×K times at L×K sampling phases.

Example 5 (Row Thinning Out)

Figure 12:
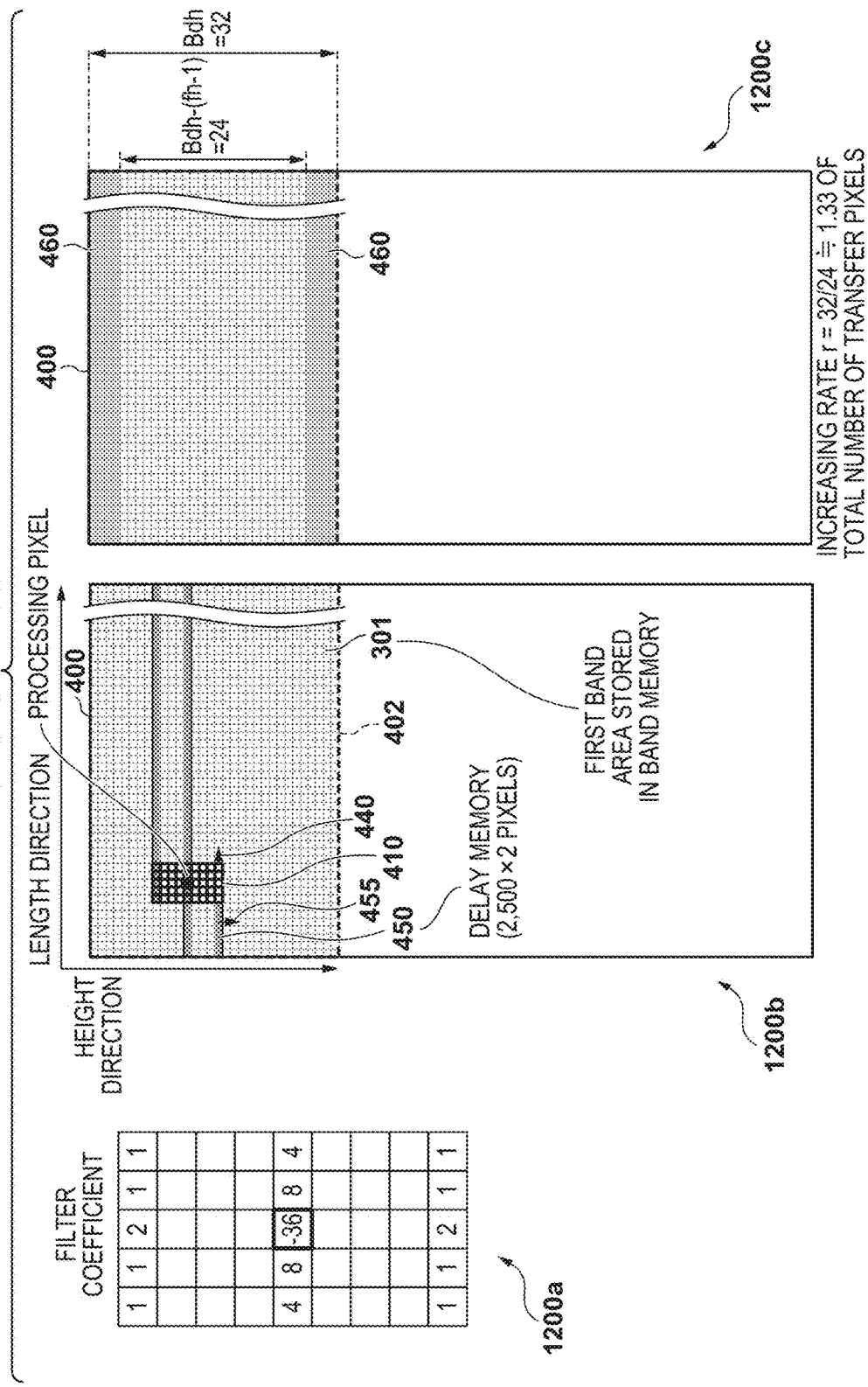
FIG. 12 is a view for explaining spatial filter processing according to a third embodiment (Example 5)

FIG. 12 is a view for explaining spatial filter processing according to the third embodiment. In this example, as shown in 1200*a*, a reference area having a width fw of 5 pixels and a height fh of 9 pixels is thinned out to include reference pixels for every four columns. That is, a length M of the reference area before the enlargement is 5, a height N of the reference area before the enlargement is 3, an enlargement ratio L in the length direction is 1, and an enlargement ratio K in the height direction is 4. In this case, processing for one band area is divided into K×L=4×1=4 processes. One of the four processes is shown in 1200*b*.

In this case, the band area has a height Bdh of 32 pixels equal to that in Example 2 or 4. However, since the reference area has the height fh of 9 pixels, an increasing rate r of the total number of transfer pixels is about 1.33, as shown in 1200*c*.

That is, while widening the size of the reference area, as compared with the first embodiment, it is possible to suppress the increasing rate r of the total number of transfer pixels to a value almost equal to that in the first embodiment.

Example 6 (Vertical and Horizontal Thinning Out)

Figure 13:
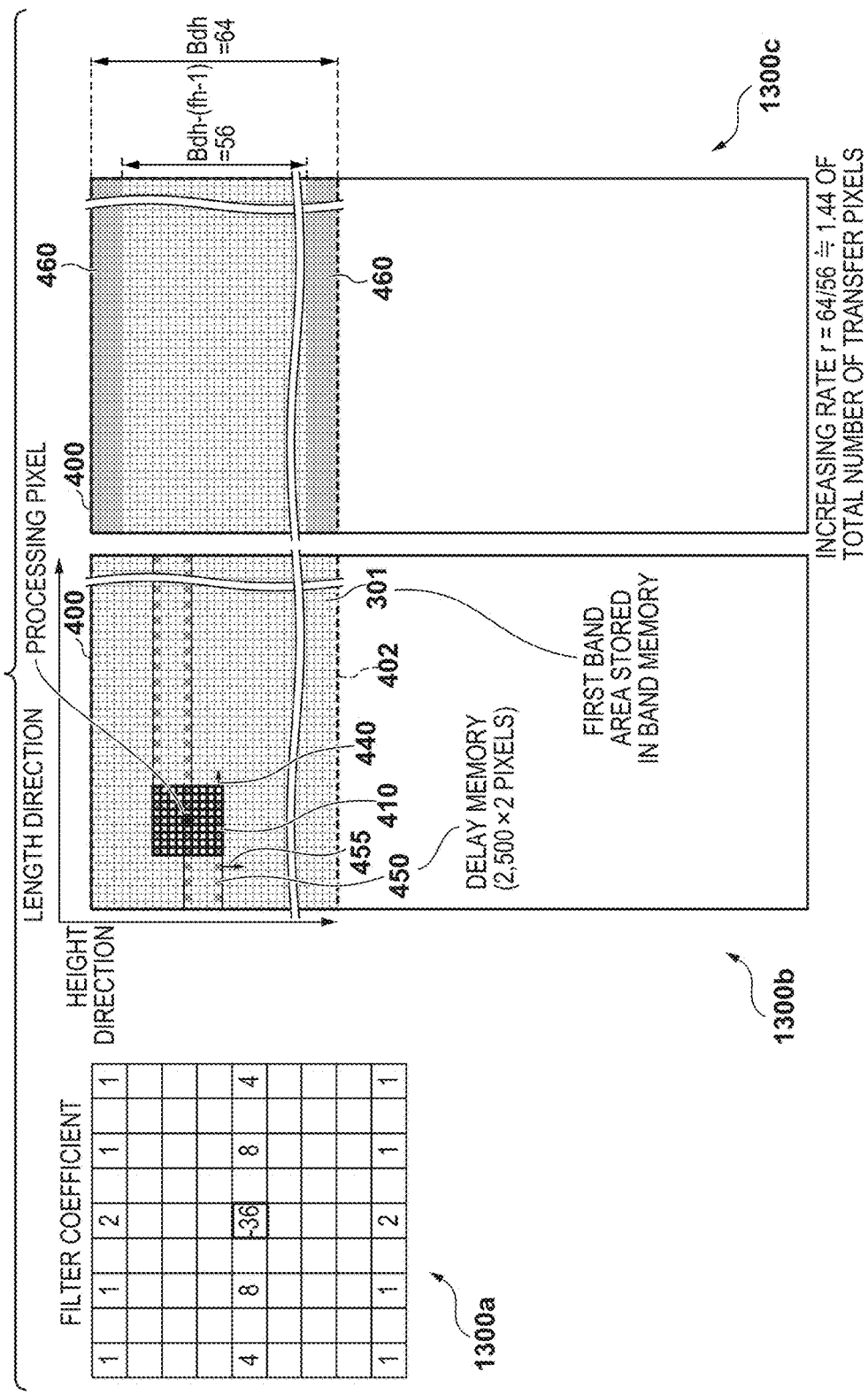
FIG. 13 is a view for explaining another spatial filter processing according to the third embodiment (Example 6)

FIG. 13 is a view for explaining another spatial filter processing according to the third embodiment. In this example, as shown in 1300*a*, a reference area has a width fw of 9 pixels and a height fh of 9 pixels. Reference pixels are arranged for every two pixels (L=2) in the length direction and for every four pixels (K=4) in the height direction. Therefore, processing for one band area is divided into K×L=4×2=8 processes. One of the eight processes is shown in 1300*b*. The processing for one band area is completed by performing the same processing as that shown in 1300*b* for the remaining seven pixel groups of different phases.

In this case, the band area has a height Bdh of 64 pixels, and an increasing rate r of the total number of transfer pixels is about 1.14, as shown in 1300*c*.

That is, while further widening the size of the reference area, as compared with Example 5, it is possible to further suppress the increasing rate r of the total number of transfer pixels.

Fourth Embodiment

The fourth embodiment will describe an example in which some of reference pixels in the reference area of spatial filter processing are appropriately thinned out in block processing. This suppresses an increase in the total number of transfer pixels, similarly to the first to third embodiments based on band processing.

FIG. 14 is a view for explaining the operation of filter processing in conventional block processing. FIG. 14 shows a block area image as the first block when one digital image data is divided into blocks. Unlike FIG. 3, one digital image data is divided into not bands but blocks. Block areas 1401 divided by block division are stored in a block memory, and each block area is processed, similarly to the band processing described with reference to FIG. 3. The coordinate system of the block area is shown in 1400*c*.

Note that FIG. 14 shows processing for the first block area 1401, as an example. However, the same processing method is adopted for the remaining block areas. A reference area 1510 has a size of a 5-by-5 pixel square, and a delay memory capacity is 64 pixels. A pixel area 1550 is an area stored in a delay memory, and a processing result in the block area 1401 is calculated using pixel values stored in the delay memory, similarly to the band processing. At this time, as shown in 1400*b*, the size of the block area is an 8-by-8 pixel square, and the size of a central area except for an overlapping area 1560 is a 4-by-4 pixel square. Thus, an increasing rate r of the total number of transfer pixels is 4.

FIG. 15 is a view for explaining spatial filter processing according to the fourth embodiment. The delay memory capacity is equal to that in the conventional block processing (FIG. 14), that is, 64 pixels. The size of the reference area is also equal to that in the conventional block processing (FIG. 14), that is, a 5-by-5 pixel square. However, reference pixels to be used for the spatial filter processing in the reference area are thinned out by the same method as that shown in 900a. Therefore, processing for the block area 1401 is divided into four processes. One of the four processes is exemplarily shown in 1500a.

As a result, as shown in 1500b, the size of the block area can be enlarged. That is, the size of the block area becomes a 16-by-16 pixel square, and the size of the central area except for the overlapping area 1560 becomes a 12-by-12 pixel square. Thus, the increasing rate r of the total number of transfer pixels becomes about 1.78.

That is, even if the size of the reference region remains unchanged, it is possible to divide the processing for one block area into a plurality of processes by thinning out and decreasing the number of reference pixels in the reference area. As a result, if the delay memory capacities are equal, it is possible to enlarge the size of the block area, as compared with the conventional block processing, thereby reducing the total number of transfer pixels.

As described above, according to the fourth embodiment, in the block processing, the spatial filter obtained by thinning out the reference pixels in the reference area without changing the size (width fw and height fh) of the reference area is used. With this arrangement, it is possible to decrease the delay memory capacity and reduce the total number of transfer pixels, as compared with conventional block processing.

Note that processing is performed by dividing image data into square blocks. However, the present invention is applicable to a case in which image data is divided into rectangular or rhomboid blocks. When performing local image processing for each of overlapping unit areas, if processing is performed by sampling each unit area in a grid pattern for each phase, it is possible to enlarge the size of the unit area as the thinning out amount is increased, thereby reducing the total number of transfer pixels. Therefore, even if each unit area is a block having a shape other than a square, if the area of the overlapping area of the unit areas remains unchanged, it is possible to obtain the effect of reducing the total number of transfer pixels.

Fifth Embodiment

The fifth embodiment will describe an example in which a plurality of image processing modes are prepared in advance and an image processing mode to be used is accepted from the user. That is, as shown in the above-described embodiments, it is possible to reduce the total number of transfer pixels by using a spatial filter obtained by thinning out reference pixels, thereby improving the processing speed (throughput). On the other hand, thinning out of reference pixels sacrifices the control performance of high-frequency components.

To solve this problem, configuration is taken so as to accept, from the user, designation of one of an image processing mode (image quality priority mode) in which the output image quality is prioritized and an image processing mode (high-speed mode) in which the processing speed is prioritized. In the image quality priority mode, when a small thinning out amount is set, the processing speed decreases but it is possible to improve the control performance of high-frequency components. On the other hand, in the high-speed mode, when a large thinning out amount is set, it is possible to improve the processing speed while maintaining the control performance of low-frequency components to which sensitivity is high in terms of the human visual characteristic.

FIG. 16 is a table exemplarily showing three modes. With respect to a processing method in each mode, the conventional band processing (FIG. 3) is used in the image quality priority mode, the method shown in FIG. 10 is used in the medium-speed mode, and the method shown in FIG. 9 is used in the high-speed mode. That is, when Q<P (P and Q are positive integers), if designation of prioritizing the output image quality is accepted, filter coefficients which refer to P pixels are selected. If designation of prioritizing the processing speed is accepted, filter coefficients which refer to Q pixels are selected. In either mode, the size of a reference area is a 5-by-5 pixel square, and thus the same control performance of low-frequency components is obtained. Note that, for example, the plurality of image processing modes are set at the time of shipment from the factory or preset by the user.

With this arrangement, the user can adjust the tradeoff between image quality (the control performance of high-frequency components) and processing speed.

Note that image processing modes other than those shown in FIG. 16 may be used in the fifth embodiment. For example, a type of printing paper designated by the user using a printer driver or a user interface on a printer is also included as an image processing mode in the fifth embodiment. Furthermore, in the fifth embodiment, when switching the thinning out amount of the reference pixels in accordance with the image processing mode, the same size of the reference area is used in all the modes, as shown in FIG. 16. However, the thinning out amount of the reference pixels and the size of the reference area may be simultaneously switched in accordance with the mode. For example, when the user can select one of photo paper and plain paper, if plain paper is selected, it is possible to implement high-speed processing by increasing the thinning out amount and decreasing the size of the reference area, as compared with a case in which photo paper is selected.

Sixth Embodiment

The sixth embodiment will describe an example in which processing is switched in accordance with the resolution of an input image. The sixth embodiment will specifically explain an example in which the size of a reference area and thinning out of reference pixels are switched.

Figure 19:
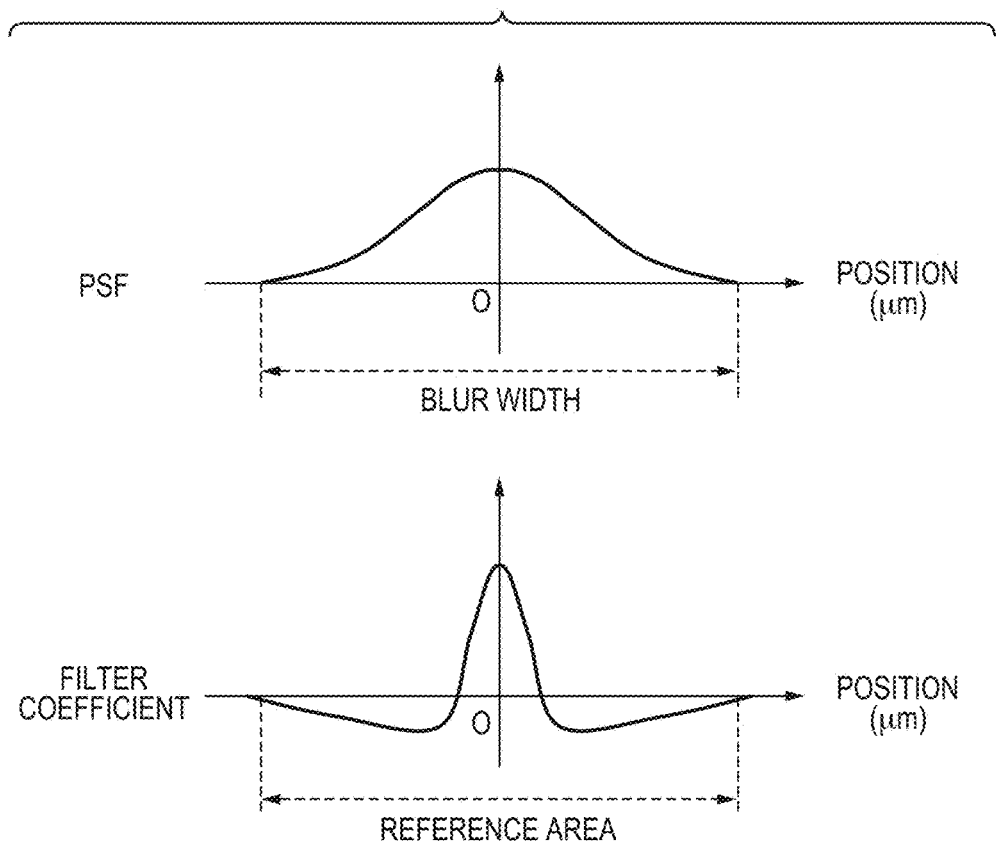
FIG. 19 shows graphs showing the relationship between the blur width of the PSF of an optical system and the reference area of the filter coefficients of a spatial filter.

FIG. 19 shows graphs showing the relationship between the blur width of the PSF (Point Spread Function) of an optical system and the reference area of the filter coefficients of a spatial filter. In processing of recovering an image blur depending on the optical system, it is impossible to obtain sufficient recovery performance unless the physical size of the reference area is set to be almost equal to a physical blur width in an image. For example, if the blur width in the image is about 210 μm, it is necessary to set the size of the reference area of the spatial filter to about 210 μm.

When the resolution of the input image is 600 dpi, the size of the reference area corresponds to a 5-by-5 pixel square. However, if the resolution is 1,200 dpi, the size of the reference area converted in terms of the number of pixels is a 10-by-10 pixel square which is larger than that when the resolution is 600 dpi. As described above, as the size of the reference area converted in terms of the number of pixels increases, an increasing rate r of the total number of transfer pixels increases, and the throughput deteriorates. Consequently, in the blur recovery processing in the optical system, even if the physical blur width is constant, if the input resolution is increased, the increasing rate r of the total number of transfer pixels increases and the throughput deteriorates.

As described above, if a delay memory capacity is constant, even if the size of the reference area is widened, it is possible to enlarge the size of a band area by thinning out the reference pixels, thereby suppressing the number of transfer pixels. In addition, as a larger thinning out amount is set, an increase in the increasing rate r of the total number of transfer pixels can be suppressed more. If the physical blur width in the optical system is constant, it is possible to suppress an increase in the increasing rate r of the total number of transfer pixels by changing the thinning out amount in accordance with whether the resolution of the input image is equal to or higher than a predetermined one.

FIG. 17 is a table exemplarily showing two settings based on the input resolutions (600 dpi and 1,200 dpi) when the blur width is constant. In this example, it is assumed that the user sets the input resolution. However, the setting of the input resolution may be accepted from an external apparatus such as a scanner.

In this example, the processing shown in FIG. 4 is performed when the resolution is 600 dpi, and the processing shown in FIG. 13 is performed when the resolution is 1,200 dpi. That is, the size of the reference area for 1,200 dpi is set larger than that for 600 dpi. However, since the thinning out amount for 1,200 dpi is larger, the numbers of reference pixels in the processes are equal to each other, thereby obtaining the same increasing rate r of the total number of transfer pixels.

As described above, by switching the processing in accordance with the resolution of the input image, it is possible to suppress an increase in the increasing rate r of the total number of transfer pixels while obtaining sufficient recovery performance in the blur recovery processing in the optical system.

Seventh Embodiment

The seventh embodiment will describe an example in which processing is switched in accordance with a blur width in an input image. The seventh embodiment will specifically explain an example in which the size of a reference area and thinning out of reference pixels are switched.

FIG. 18 is a table exemplarily showing two settings based on blur widths (small and large) when the resolution is constant. In this example, it is assumed that the user sets the blur width. However, the setting of the blur width may be accepted from an external apparatus.

In this example, the processing shown in FIG. 4 is performed when the blur width is small (for example, less than 200 μm), and the processing shown in FIG. 13 is performed when the blur width is large (for example, 200 μm or more). That is, the size of the reference area is changed in accordance with whether the blur width is equal to or larger than a predetermined one. Note that the size of the reference area may be sequentially increased in proportion to the blur width. Similarly to the case shown in FIG. 17, since the thinning out amount is set larger as the blur width is larger, an increasing rate r of the total number of transfer pixels remains unchanged.

As described above, by switching the processing in accordance with the blur width, it is possible to suppress an increase in the increasing rate r of the total number of transfer pixels while obtaining sufficient recovery performance in blur recovery processing in an optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-156244, filed Aug. 6, 2015 and 2016-138905, filed Jul. 13, 2016 which are hereby incorporated by reference herein in their entirety.

What is claimed is:

1. An image processing apparatus for dividing an input image into a plurality of band area images so that each band area partially overlaps an adjacent band area, successively storing the respective band area images in a band memory, and performing image processing, the image processing apparatus comprising:
　　at least one of:
　　　　one or more circuits; or
　　　　one or more processors and at least one memory, the at least one memory being coupled to the one or more processors and having stored thereon instructions executable by the one or more processors;
　　wherein at least one of the one or more circuits or the execution of the instructions cause the image processing apparatus to function as:
　　　　a storage unit configured to store filter coefficients having a two-dimensional reference area of M pixels in a first direction and N pixels in a second direction orthogonal to the first direction; and
　　　　a spatial filter unit configured to apply, to the band area image stored in the band memory, a spatial filter using the filter coefficients, wherein coefficients are set as the filter coefficients so as to refer to pixels for every K pixels in the second direction, and the spatial filter unit sequentially applies the spatial filter to the band area image K times so that sampling phases by the filter coefficients for the band area image are mutually different in the second direction.

2. The image processing apparatus according to claim 1, wherein coefficients are further set as the filter coefficients so as to refer to pixels for every L pixels in the first direction, and the spatial filter unit sequentially applies the spatial filter K×L times so that sampling phases by the filter coefficients for the band area image are mutually different.

3. The image processing apparatus according to claim 1, wherein the storage unit further stores reference area enlargement filter coefficients having a reference area of M pixels in the first direction and K×(N−1)+1 pixels in the second direction, wherein coefficients are set as the reference area enlargement filter coefficients so as to refer to pixels for every K pixels in the second direction, and if the reference area enlargement filter coefficients are used, the image processing apparatus successively stores, in the band memory, the band area image of an area which is K times an area if reference pixels are not thinned out, and the spatial filter unit sequentially applies the spatial filter K times so that sampling phases by the reference area enlargement filter coefficients for the band area image are mutually different in the second direction.

4. The image processing apparatus according to claim 1, wherein one of a height and a length of the band area image is equal to at least one of a height and a length of the input image.

5. The image processing apparatus according to claim 1, wherein the storage unit stores first filter coefficients which refer to P pixels and second filter coefficients which refer to Q (Q<P) pixels where each of the set of first filter coefficients and the set of second filter coefficients has the same reference area, the image processing apparatus further includes an acceptance unit configured to accept designation of whether to prioritize output image quality or a processing speed, and a selection unit configured to, if the acceptance unit accepts designation of prioritizing the output image quality, select the first filter coefficients, and if the acceptance unit accepts designation of prioritizing the processing speed, select the second filter coefficients, and the spatial filter unit uses the filter coefficients selected by the selection unit.

6. The image processing apparatus according to claim 1, wherein the storage unit stores first filter coefficients having a first reference area and second filter coefficients having a second reference area wider than the first reference area, the image processing apparatus further includes an acceptance unit configured to accept designation of a resolution of the input image, and a selection unit configured to, if the acceptance unit accepts a resolution lower than a predetermined resolution, select the first filter coefficients, and if the acceptance unit accepts a resolution not lower than the predetermined resolution, select the second filter coefficients, and the spatial filter unit uses the filter coefficients selected by the selection unit.

7. The image processing apparatus according to claim 1, wherein the storage unit stores first filter coefficients having a first reference area and second filter coefficients having a second reference area wider than the first reference area, the image processing apparatus further includes an acceptance unit configured to accept designation of an image blur width in the input image, and a selection unit configured to, if the acceptance unit accepts a blur width narrower than a predetermined blur width, select the first filter coefficients, and if the acceptance unit accepts a blur width greater than or equal to the predetermined blur width, select the second filter coefficients, and the spatial filter unit uses the filter coefficients selected by the selection unit.

8. A control method for an image processing apparatus which divides an input image into a plurality of band area images so that each band area partially overlaps an adjacent band area, successively stores the respective band area images in a band memory, and performs image processing, the method comprising:

storing filter coefficients having a two-dimensional reference area of M pixels in a first direction and N pixels in a second direction orthogonal to the first direction;

applying, to the band area image stored in the band memory, a spatial filter using the filter coefficients, wherein coefficients are set as the filter coefficients so as to refer to pixels for every K pixels in the second direction; and sequentially applying the spatial filter to the band area image K times so that sampling phases by the filter coefficients for the band area image are mutually different in the second direction.

9. A non-transitory computer-readable recording medium storing a program that causes a computer to function as an image processing apparatus for dividing an input image into a plurality of band area images so that each band area partially overlaps an adjacent band area, successively storing the respective band area images in a band memory, and performing image processing, the image processing apparatus comprising:

a storage unit configured to store filter coefficients having a two-dimensional reference area of M pixels in a first direction and N pixels in a second direction orthogonal to the first direction; and a spatial filter unit configured to apply, to the band area image stored in the band memory, a spatial filter using the filter coefficients, wherein coefficients are set as the filter coefficients so as to refer to pixels for every K pixels in the second direction, and the spatial filter unit sequentially applies the spatial filter to the band area image K times so that sampling phases by the filter coefficients for the band area image are mutually different in the second direction.

* * * * *